(12) United States Patent
Blume

(10) Patent No.: US 6,955,339 B1
(45) Date of Patent: *Oct. 18, 2005

(54) VALVE BODY WITH INTEGRAL SEAL RETENTION GROOVE

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 49 days.

This patent is subject to a terminal disclaimer.

(21) Appl. No.: 10/715,043

(22) Filed: Nov. 17, 2003

Related U.S. Application Data

(63) Continuation-in-part of application No. 10/223,304, filed on Aug. 19, 2002, now Pat. No. 6,679,477.

(51) Int. Cl.[7] .................................................. F16K 1/00
(52) U.S. Cl. ...................... 251/318; 251/367; 277/316; 277/437; 137/15.18
(58) Field of Search ................................ 251/318, 331, 251/332, 366, 367; 137/15.18, 516.29; 277/316, 277/437; 29/888.4

(56) References Cited

U.S. PATENT DOCUMENTS

| | | | | |
|---|---|---|---|---|
| 1,705,800 A | * | 3/1929 | Akeyson | 251/332 |
| 3,090,596 A | * | 5/1963 | Gifford | 251/333 |
| 4,951,707 A | * | 8/1990 | Johnson | 137/516.29 |
| 5,088,521 A | * | 2/1992 | Johnson | 137/516.29 |
| 5,249,600 A | * | 10/1993 | Blume | 137/516.29 |
| 5,480,163 A | * | 1/1996 | Miser et al. | 277/437 |
| 6,435,475 B1 | * | 8/2002 | Blume | 251/318 |
| 6,679,447 B2 | * | 1/2004 | Jallot et al. | 242/384.4 |

* cited by examiner

*Primary Examiner*—Michael Mar
*Assistant Examiner*—Patrick Buechner
(74) *Attorney, Agent, or Firm*—Dennis W. Gilstad

(57) ABSTRACT

A valve body has one or more integral seal retention grooves and one or more interior hollows which may be manufactured using frictional or other types of welding to join two previously formed portions through at least one cylindrical web. Forging or casting valve body portions to near-net-shape prior to joining minimizes machining necessary to achieve a final desired shape. One or more interior hollows and an integral seal retention groove are formed in the welded valve body from features present on the portions joined by welding to form the body. Increased valve durability and reduced metal wear arise from the reduced valve body weight and correspondingly reduced impact loading. An elastomeric seal may be cast and cured in place in a seal retention groove.

10 Claims, 19 Drawing Sheets

VALVE BODY WITH INTEGRAL SEAL RETENTION GROOVE

This is a continuation-in-part (CIP) patent application of U.S. Ser. No. 10/223,304, which was filed Aug. 19, 2002 now U.S. Pat. No. 6,679,477.

SPECIFICATION

1. Field of the Invention

The invention relates generally to valves suitable for abrasive fluids, such as drilling mud, under high pressures. More specifically, the invention relates to valve bodies wherein the valve body comprises at least one integral seal retention groove.

2. Background of the Invention

A valve suitable for abrasive fluids such as oil field drilling mud comprises a valve body and a corresponding valve seat, with certain valve bodies incorporating an elastomeric seal within a peripheral seal retention groove. Such a valve is usually mounted in the fluid end of a pump incorporating positive displacement pistons or plungers in multiple cylinders. Such valves may be stem-guided full-open designs (i.e., having a top guide stem and a bottom crow-foot guide on the valve body) or web-seat, stem-guided designs (i.e., having top and bottom guide stems on the valve body) adapted for high pressures and repetitive high-impact loading of the valve body and valve seat. Note that stem-guided full-open designs are also commonly known as full-open seat wing-guided designs; the former term will be used herein for convenience. However named, the above valves are expensive to manufacture, especially the moving portion or valve body. Besides requiring finish machining to close tolerances for adequate sealing, such valve bodies must be made strong enough to resist significant distortion under load with resultant leaks and fatigue failures. Prior efforts to reduce distortion under load by strengthening such valve bodies have generally resulted in higher cost and/or heavier designs which exacerbate sealing problems and/or increase the stress of impact loading on components of the valve assembly.

Commercially important design improvements necessarily reflect the fact that certain mud pump valve body and seat dimensions are effectively limited by industry practices and American Petroleum Institute (API) Standards. For example, the web-seat, stem-guided designs favored for mud pump valves are commonly made compatible with the industry benchmark widely known as the TRW Mission 4-web seat, which determines many valve dimensions. Further, API Standards determine the envelope into which valve bodies and seats must fit to promote interchangeability in the field.

Given these constraints, attempts to reduce fatigue failures and/or improve valve performance have led to "improved" designs which are more expensive to manufacture and have different failure modes than earlier versions. For example, valve bodies with circular "Channel-Beam" sections may incorporate a forged bowl shape as seen, for example, in FIG. 1 of U.S. Pat. No. 5,249,600, the entire patent being incorporated herein by reference. This forged valve body has exceptional stiffness and strength.

But such valve bodies have several disadvantages in manufacture and use. First, rough valve body forgings in the Channel-Beam shape require substantial material removal in finish machining of the integral seal retention groove. Second, an elastomeric seal snapped into the seal retention groove may not fully seat around the entire valve body, causing an out-of-round condition that can result in early valve failure. Third, certain portions of the valve body may be made relatively thin to reduce weight, but such thin portions require particular care during heat treatment to avoid excessive brittleness. Avoidance of thin portions, on the other hand, imposes weight penalties that result in greater impact loading. Similar disadvantages are generally present in other Channel-Beam designs, such as those described in U.S. Pat. Nos. 3,191,617; 3,202,178; 3,742,976; 4,180,097; 5,345,965; and 5,431,186, all incorporated herein by reference.

Notwithstanding their relatively high cost, however, valve bodies having an integral seal retention groove (i.e., a seal retention groove having no removable seal retention plate or other analogous removable structural member) such as the one-piece Channel-Beam design have gained limited industry acceptance. Their high strength and stiffness effectively counter valve body distortion about one or more axes, that is, axes radiating perpendicularly from the valve body's longitudinal axis of symmetry (radial axes) and/or axes colinear with or parallel to tangents to the valve body periphery (tangential axes). Distortion about radial axes is particularly a problem on valve bodies that mate with web seats, whereas distortion about tangential axes is more important on valve bodies that mate with full-open seats. Cyclical high pressure applied to a valve body when it is sealed against a web seat is especially damaging, tending to repeatedly force portions of the valve body into the spaces between the seat webs. The periphery of the disc-shaped area of the valve body (commonly called the flange) then tends to wrinkle like a cupcake paper, the number of wrinkles being equal to the number of seat webs.

On multi-piece valve bodies (i.e., valve bodies having a removable seal retention plate), cyclic loading as described above induces fatigue that can lead to further distortion and/or failure of the valve flange. Countering such distortion by simply making the flange thicker increases total valve body weight, which in turn increases wear due to higher impact loading of both the valve body and seat. Valve bodies of Channel-Beam design minimize such distortion in part through their inherent rigidity and strength, but they weigh even more than comparable multi-piece valve bodies and so suffer the disadvantage of higher impact loads in use.

Another important disadvantage of the Channel-Beam design, as noted above, relates to seating of the seal insert. Channel-Beam valve bodies generally incorporate an elastomeric seal insert that snaps into its peripheral seal retention groove. A typical "snap-on" seal insert comprises a portion of a toroidal structure such as a plastic or rubber ring that is sized to fit tightly, and thus sealingly, in the peripheral seal retention groove. When properly fitted, the elastomeric seal mates tightly with a corresponding valve seat even though the valve body is slightly distorted and even if small particles carried by the pumped fluid may be trapped between sealing surfaces. Practical advantages of such a seal insert include extended valve life and improved valve performance, but proper fitting and sealing of the elastomeric ring on a valve body is often difficult in the field.

For example, the snap-on insert may not exactly fit the Channel in a Channel-Beam valve body. The installed seal may then be out-of-round, leading to premature seal failure and subsequent failure of the valve body and web seat. If a relatively small snap-on seal is used to decrease the likelihood of leakage between the seal and the valve body, the seal must then be stretched excessively during placement on the valve body. Such stretching substantially increases residual internal stress in the seal elastomer, predisposing it to premature failure. When such a seal fails, leaking high-pressure fluid will jet through the initial leak path. If the valve remains in service, the leaking, jetting high-pressure fluid will literally wash away the hardened steel of the valve body and/or seat. Multiple and near-simultaneous failures of a single seal ring may give a valve body flange the appearance of a wrinkled cupcake paper.

Those skilled in the art have understood that leaks due to seal displacement within a seal retention groove may even occur when elastomeric seals are cast and cured in place, thus making it a necessary step to treat metal with a bonding agent before molding of an elastomeric seal. See, for example, U.S. Pat. No. 5,480,163. Such bonding of the cured seal to the groove wall, while conventional, is expensive, and it also tends to reduce the service life of the seal due to internal residual stress induced as the curing elastomer tends to shrink away from the walls to which it is bound. Additionally, field replacement of such seals is not practical.

Another disadvantage of Channel-Beam valves is the relatively high manufacturing cost of the valve bodies themselves. They are expensive to manufacture because the forgings from which they are machined are not near-net-shape. Significant machining time is needed to remove excess material from the seal retention groove (the Channel). Further, because of their characteristic shape, Channel-Beam valve bodies require longer (non-standard) springs to accommodate the extra depth of the bowl.

Some of the above problems associated with high machining and materials costs, as well as those associated with seal movement and/or out-of-round seal placement, are reduced in valve bodies which incorporate a separate (removable) seal retention plate which commonly screws or bolts to the valve body to form at least part of one wall of a seal retention groove. Separate seal retention plates can be forged to near-net-shape, and they reduce the time required to correctly replace toroidal sealing rings. But they also raise valve fabrication costs and impose use restrictions. For example, they add excess weight to the moving valve body, aggravating impact loading stress. And a removable seal retention plate must be handled separately from the remainder of the valve body during manufacturing. Additionally, special skills and tools are required for proper assembly of a retention plate and seal ring on a valve body. Finally, the threads often used to secure a retention plate to a valve body are both expensive to machine and, because portions of the threads are relatively thin, they demand special protection during heat treatment. Nevertheless, removable seal retention plates are commonly used because such a plate, as well as the valve body to which it is attached in use, can be forged to a "near-net-shape" which requires relatively little finish machining to achieve a desired final shape.

Unfortunately then, even though forged valve bodies having integral seal retention groves, as in the Channel-Beam design, are inherently stronger than designs requiring a removable seal retention plate, they are generally heavier, more expensive to make, and prone to failure due to seal movement and/or out-of-round seals. What is needed is a valve body having strength and rigidity comparable to that of the Channel-Beam design without the disadvantages of high production costs, seal movement and/or out-of-round seal placement.

Attempts to overcome the cost disadvantage of forged valve bodies having integral seal retention grooves have included elimination of forgings altogether, substituting cast valve bodies instead. Though such castings may be produced to near-net-shape and thereby reduce machining costs, the generally higher cost of the casting process itself, compared to forging, has substantially eliminated any hoped-for reduction in overall cost. Additionally, cast valve bodies generally have lower impact strength compared to similarly shaped forgings. Thus, there is a need for a relatively light weight forged valve body incorporating the strength advantages of an integral seal retention groove and the efficiencies of initially forming to near-net-shape.

SUMMARY OF THE INVENTION

The invention relates to valve bodies for use in stem-guided full-open valves and/or web-seat, stem-guided valves wherein the valve body encloses at least one hollow and comprises at least one integral seal retention groove. Such valve bodies are relatively stiff for their weight, resisting distortion about radial axes. Illustrated valve bodies of the invention are made by joining first and second portions through at least one cylindrical web of predetermined minimum thickness. Each of the first and second portions is symmetrical about its own respective longitudinal axis, the two longitudinal axes being colinear when the two respective portions are joined to form a valve body. The two colinear axes thus form the valve body's common longitudinal axis of symmetry, and each cylindrical web is radially spaced apart from and symmetrically disposed about the common longitudinal axis. Such radial spacing is measured as the perpendicular distance between the inner surface of the cylindrical web and the common longitudinal axis.

The first and second valve body portions are formed to near-net-shape before being joined. Joining can be by frictional welding (particularly inertia welding), but may be by any means of bonding the corresponding mating surfaces on the first and second portions, including electric arc welding or electron beam welding. Corresponding mating surfaces are substantially circular and have sufficient area to allow adequate strength to be developed across the mating surfaces when the portions are joined. Illustrated embodiments of corresponding mating surfaces include a substantially flat or conical washer-shaped circular mating surface on the first portion which may be brought into substantial contact with a circular mating surface of similar size and complementary shape on the second portion to form a circular contact area.

Each of the respective first and second portions illustrated comprises a disc-shaped body (called a flange) having first and second opposing sides. For either of the valve designs described above, a guide stem extends perpendicularly and symmetrically from the first opposing side (that is, along the respective longitudinal axis) and thus away from a circular mating surface that is symmetrically disposed about the respective longitudinal axis on the second opposing disc side.

The mating surface(s) on at least the first valve body portions illustrated are on one or more cylindrical bosses arising from the disc-shaped body. When such a first portion is joined through one or more corresponding mating surfaces with a second portion in a valve body of the invention, the cylindrical bosses form most of the cylindrical web(s) that space apart and connect the first and second portions after the respective corresponding mating surfaces are joined (e.g., by welding them together). In such an embodiment, only a single weld along each circular contact area of corresponding mating surfaces is needed to join the first and second valve body portions to form a valve body of the invention.

A space peripherally bounded by the boss on the first valve body portion is incorporated in a hollow enclosed by the valve body (and peripherally bounded by the cylindrical web) as a result of joining the respective first and second portions. Such a hollow may additionally include space comprising, for example, one or more depressions in the first and/or second portions that do not extend peripherally beyond the respective mating surfaces and that are symmetrical about the longitudinal axis.

In alternative embodiments of the valve body of the invention, both first and second portions may comprise a boss or both may simply have a circular mating surface without a boss. In the latter case, a separate cylindrical web structure of predetermined height may be welded (using two circular welds) between the two portions to establish the desired longitudinal spacing between the respective disc-shaped bodies (that is, the flanges) of the first and second portions.

In valve bodies of the invention, the desired longitudinal spacing between the respective flanges is determined in part by the dimensions of the integral seal retention groove which is formed peripherally between the first and second portions after they are joined. Seal retention groove dimensions for a valve body intended, for example, to be used as a replacement for another valve body previously used with a TRW Mission 4-web seat, must match analogous dimensions on the previously used valve body.

Regardless of the methods of fabrication of valve bodies of the invention, peripheral areas of the respective disc-shaped bodies of the first and second portions substantially form the opposing walls of an integral seal retention groove in the finished valve body. A cylindrical web connecting the two opposing groove walls forms the part of the wall of the seal retention groove that is closest to the valve body's common longitudinal axis (i.e., the valve body's axis of symmetry). In such a valve body, relatively little machining is required to achieve a desired final shape because each of the first and second portions is formed to near-net-shape (with certain parts optionally machined to final shape) before the portions are joined. For example, serrations in a seal retention groove wall that would be suitable for retaining a cast-in-place elastomeric valve seal in the seal retention groove (without recourse to the bonding conventionally called for) may be formed by forging the serrations in the first and/or second portions before they are joined, or by machining the serrations either before or after forging. Forming the serrations by forging may reduce both fabrication and materials costs by reducing or eliminating machining operations. If at least one serration is formed by forging or casting, it may retain its as-forged or as-cast surface, or portions may be machined to produce an as-machined surface before and/or after the portions are joined.

As noted above, in valve bodies of the invention either or both of the first and second valve body portions may comprise a symmetrical depression (that is, a depression symmetrical about the longitudinal axis of symmetry). The hollow or hollows formed within the valve body when such portions are joined may substantially comprise just the cylindrical space peripherally bounded by a boss comprising a mating surface on one of the valve body portions. The hollow may also be enlarged, and/or its shape may be changed, by incorporating one or two of the symmetrical depressions described above. Any such a hollow will be symmetrical about the common longitudinal axis of the valve body and will be limited peripherally by a cylindrical web.

A hollow thus formed by joining of the first and second portions to make a valve body may be totally enclosed (i.e., not in fluid communication with space outside the valve body). Alternatively, the hollow may be substantially enclosed by the valve body but in fluid communication with space outside the valve body through a fluid passage in the valve body. If present, this fluid passage must be adapted to be sealed so as to prevent fluid entry into the hollow when the valve body is put into service.

The presence or absence of such a fluid passage affects the structure of the finished valve, particularly during carburization. When desired, such a passage may be formed, for example, by drilling longitudinally in the top guide stem. Any such passage is plugged (as, for example, by a welded plug) before the valve body is put into service to prevent drilling mud or other foreign matter from entering the hollow enclosed by the valve body and thus adding weight (perhaps asymmetrically) to the valve body.

The presence of one or more hollows within a valve body of the invention confers several advantages. Necessary flange stiffness is maintained while the mass of the valve body is reduced, thus reducing impact loading. Adequate valve body stiffness is maintained through the action of one or more cylindrical webs in conjunction with the flanges. Reducing impact loading while maintaining adequate valve body stiffness reduces the incidence of fatigue fractures and extends the service life of elastomeric seals, corresponding valve seats, and the valve bodies themselves.

In some illustrated embodiments of a valve body, a single interior hollow is substantially symmetrical about the valve body's common longitudinal axis. The single hollow extends symmetrically along radial axes from the common longitudinal axis peripherally to the cylindrical web, as well as extending along the longitudinal axis to the two disc-shaped bodies (flanges) of the valve body's respective first and second portions. Should multiple interior hollows be desired, a single cylindrical interior hollow, for example, may be subdivided into a smaller (central) cylindrical hollow plus one or more toroidal spaces symmetrical about the valve body's common longitudinal axis by the inclusion of one or more additional concentric cylindrical webs. Each web present extends between and thus spaces apart and connects the two disc-shaped bodies that are thus joined in the completed valve body. Inclusion of a center post symmetrical about the longitudinal axis in this example would result in conversion of the smaller cylindrical hollow into an additional (concentric) toroidal shaped hollow enclosed within the valve body.

Each cylindrical web in a valve body of the invention functions in conjunction with the flanges in a manner analogous to the web of an I-beam. Thus, a cylindrical web imparts resistance to deformation of the valve body about any radial or tangential axis. Bending stress about a radial or tangential axis, tending to cause deformation of the valve body, will largely result in corresponding tensile and compressive stresses in adjacent parts of the disc-shaped bodies (that is, flange regions), with relative sparing of the web itself. For this reason, the web thickness can be, and preferably will be, less than the thickness of the respective flange regions where they connect with the web in the finished valve body.

Note that in embodiments of the valve body of the invention which comprise a plurality of cylindrical webs, the structure resisting bending of the valve body about a radial or tangential axis will resemble one or more box beams rather than an I-beam. In such embodiments, two or more concentric cylindrical webs form the box beam webs, and these webs space apart and connect the compression-resisting and tension-resisting members (the flange regions). As described above, distortion about one or more radial or tangential axes will result primarily in tension and compression forces in the flange regions with relative sparing of the box beam webs (which can then be made relatively thinner).

Thus, valve bodies of the invention, whether comprising one or a plurality of interior hollows, are strong and stiff but relatively light-weight compared to competing designs. They are relatively easy to fabricate and require relatively little finish machining. They can reduce overall impact stress concentrations near sealing surfaces of the valve body and valve seat, resulting in improved durability and reduced wear in other components of valve assemblies in which such valve bodies are used.

DETAILED DESCRIPTION

Figure 1:
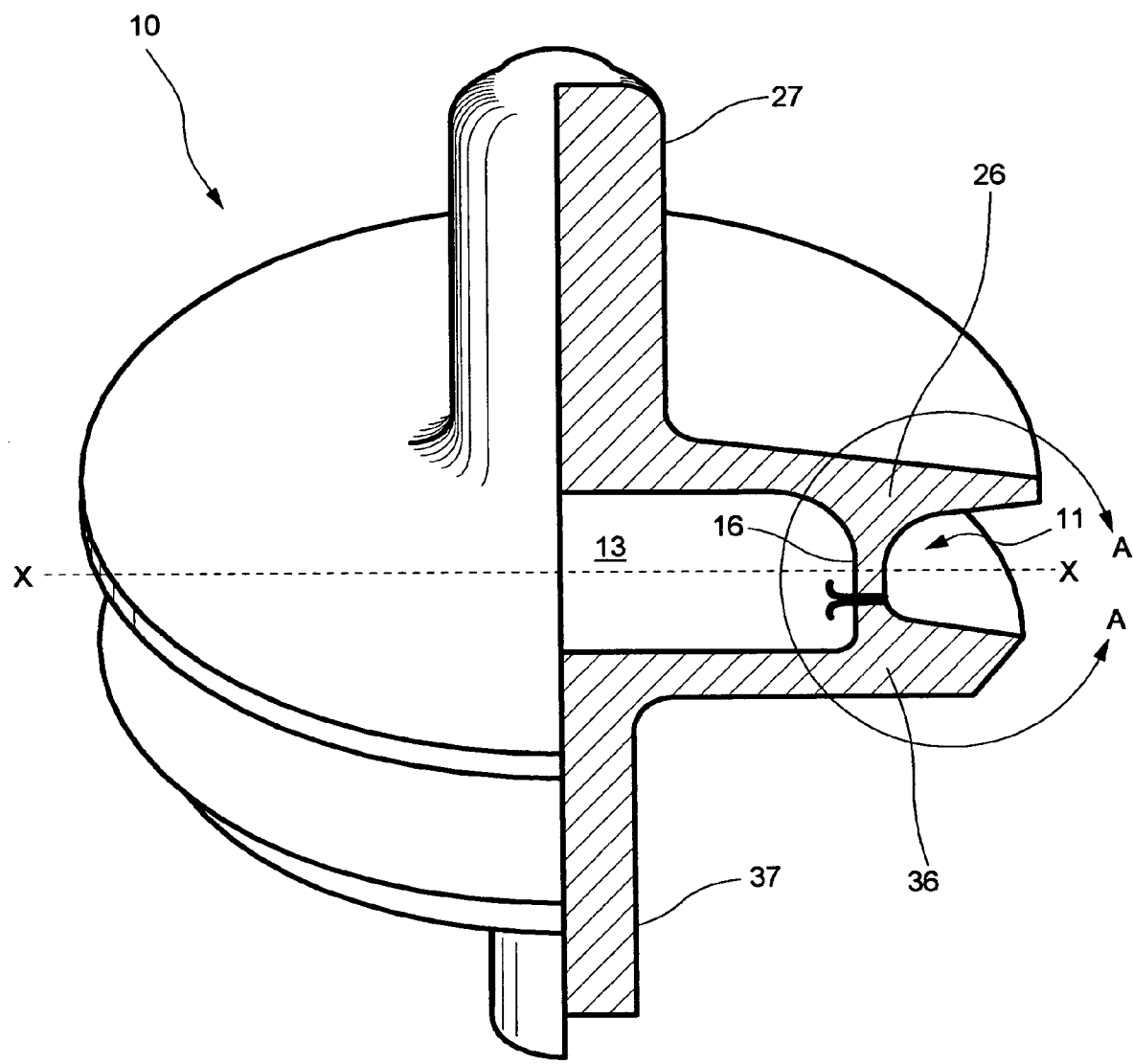
FIG. 1 illustrates a schematic view with partial cross-section of a valve body for use in web-seat, stem-guided valves; the valve body totally encloses a single hollow.

FIG. 1 illustrates a schematic view with partial cross-section of a valve body 10 for use in web-seat, stem-guided valves. Valve body 10 comprises integral seal retention groove 11, cylindrical web 16, first and second guide stems 27 and 37 respectively, and hollow 13. Seal retention groove 11 is machined smooth to accept a snap-on elastomeric seal. The area encircled by line A—A functions in a manner analogous to an I-beam to resist deformation (i.e., wrinkling) of the valve body about radial axis X—X or about a tangential axis perpendicular to radial axis X—X. Note that the illustrated cross section encircled by line A—A in FIG. 1 suggests an I-beam shape, with the relatively lighter cylindrical web 16 positioned analogously to a web connecting the relatively heavier flange regions 26 and 36. In conjunction with its impact on a valve seat, the periphery of disc-shaped valve body 10 tends to be displaced in a direction substantially parallel to the (longitudinal) axis of symmetry of valve body 10. As noted above, such displacement in conjunction with use of a web seat tends to wrinkle the valve body periphery in a manner somewhat analogous to that observed in a cupcake paper. This manner of wrinkling, in turn, potentiates bending or distortion substantially about a plurality of axes (i.e., axes radiating perpendicularly from the longitudinal axis of symmetry of the valve body).

Bending about any such radial axis, however, is resisted by a combination of tension in flange region 26 and compression in flange region 36 or vice versa, depending on the direction of bending. The separation (that is, spacing apart) of flange regions 26 and 36 which is effected by cylindrical web 16 thus substantially increases the stiffness of valve body 10 with relatively little increase in weight.

Note that in certain embodiments of valve body 10 for oil field service, the diameter of first guide stem 27 is determined by API standards, while the diameter of second guide stem 37 is determined by the size of the corresponding guide stem hole in a TRW Mission 4-web seat commonly used in the oil industry. Note also that valve bodies such as valve body 10 in FIG. 1 can be used with standard length valve springs in web-seat, stem-guided valves. Older designs such as the Channel-Beam configuration, in contrast, require longer valve springs in general because of the characteristic bowl-shaped depression present in the valve body.

Figure 2A:
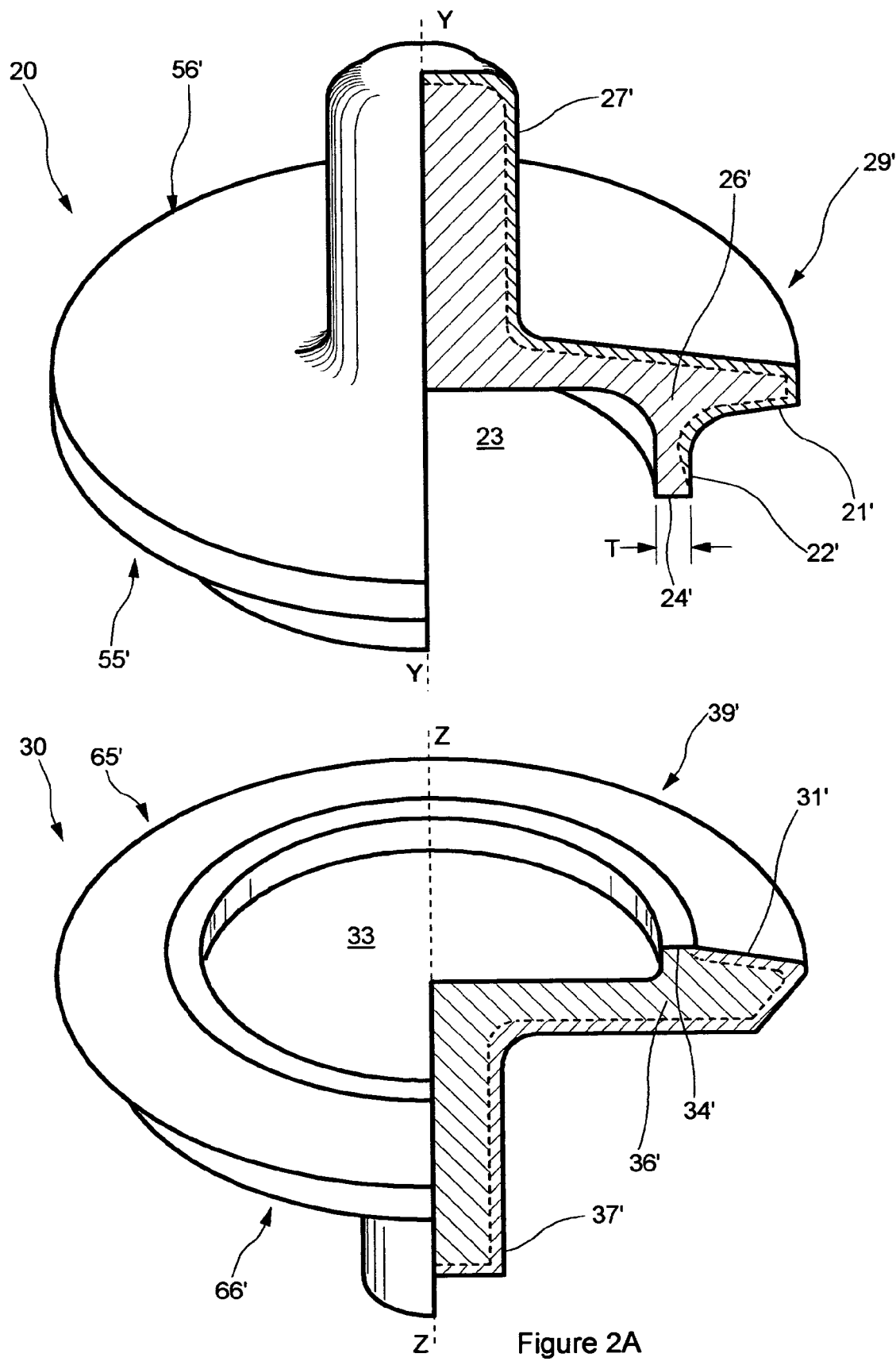
FIG. 2A schematically illustrates partial cross-sections showing first and second portions of a near-net-shape valve body prior to joining of the portions.
Figure 3:
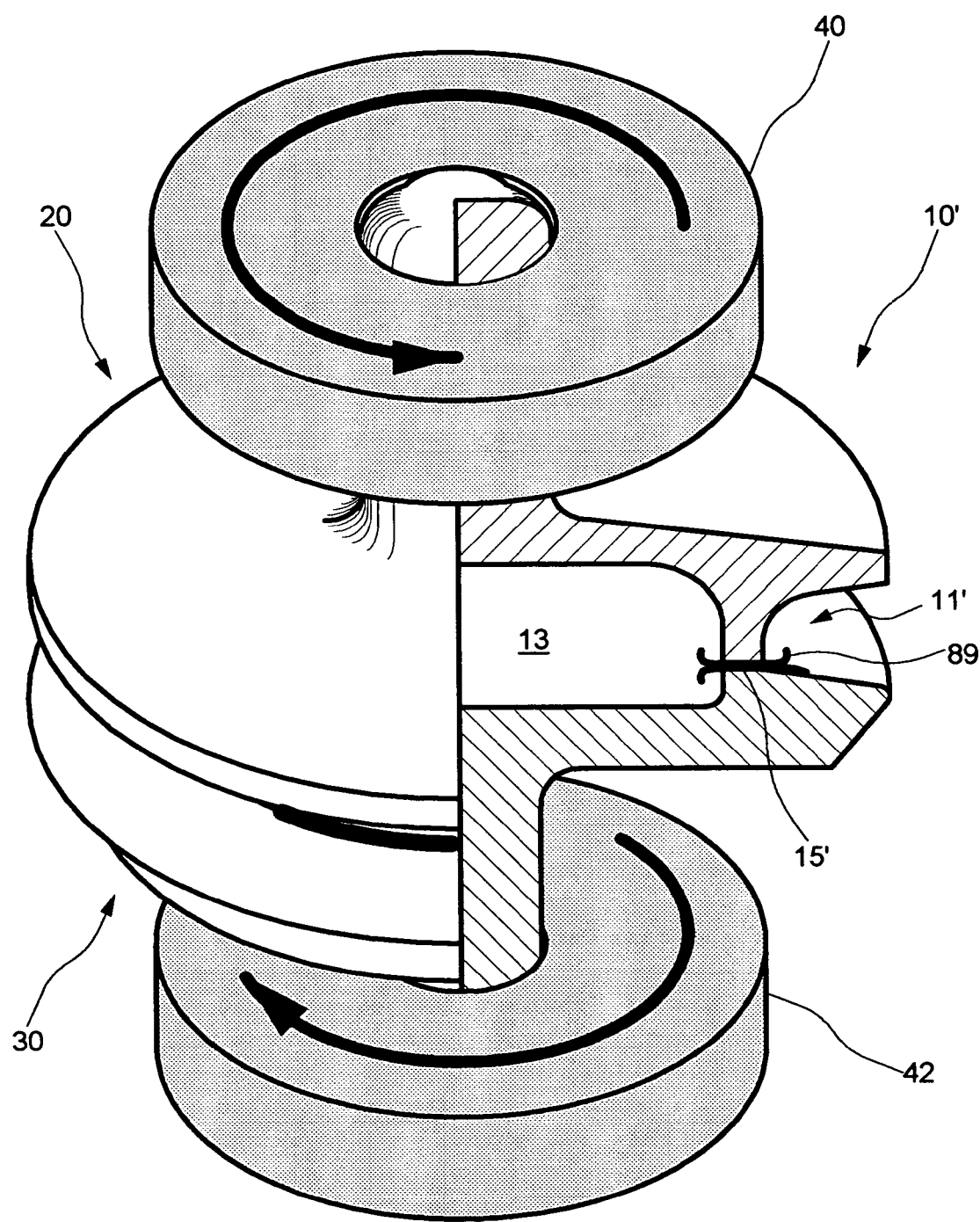
FIG. 3 schematically illustrates relative motion of the two portions of a valve body to facilitate frictional welding for joining the two portions.

FIG. 2A schematically illustrates partial cross-sections showing a near-net-shape first portion 20 and a near-net-shape second portion 30 before they are joined to form a near-net-shape valve body 10' as seen in FIG. 3. A near-net-shape valve body 10' can be finish machined to the form of valve body 10 as shown in FIG. 1 by removal of relatively little material, compared to the material removal that would be required if a valve body of similar external shape were forged in one piece. For severe valve service conditions, both portion 30 and portion 20 are preferably forged (instead of, for example, being cast) in an appropriate metal such as mild steel to near-net-shape. But casting of at least one portion 20 or 30 may lower fabrication costs of valves.

In the illustrated embodiment of FIG. 2A, first portion 20 is forged symmetrically about a first longitudinal axis y—y. First portion 20 comprises a first disc-shaped body 29' having first and second opposing sides, 55' and 56' respectively, and flange region 26' which is adjacent to cylindrical boss 22'. The first opposing side 55' of disc-shaped body 29' comprises cylindrical boss 22', circular boss mating surface 24' and one of two opposing integral seal retention groove walls, groove wall 21'. Note that primes on labels such as groove wall 21' and flange region 26' denote the respective structures prior to finish machining. A substantially cylindrical space 23 is peripherally bounded by boss 22' on said first opposing side 55' of first disc-shaped body 29', and a first guide stem 27' extends from second opposing side 56' of first disc-shaped body 29', extending away from substantially cylindrical space 23 along longitudinal axis y—y. Substantially cylindrical space 23 is peripherally limited by cylindrical boss 22', cylindrical boss 22' comprising a circular boss mating surface 24' and having a wall thickness T measured at cylindrical boss mating surface 24. The wall thickness of cylindrical boss 22' preferably tapers from a relatively greater value at the boss base (adjacent to flange region 26'), which includes fillets for stress relief, to a smaller and substantially uniform value near the circular boss mating surface 24'. The wall thickness of cylindrical boss 22' will thus preferably be everywhere equal to or greater than T (the wall thickness at the cylindrical boss mating surface 24). Note that small inconsistencies in thickness of a cylindrical web 16 (which is substantially formed from cylindrical boss 22' upon joining of the first and second portions) are associated with different methods of joining. Such methods include, but are not limited to, frictional welding, electron beam welding, flash welding, tungsten-inert-gas (TIG) welding, metal-inert-gas (MIG) welding, laser welding, submerged electric arc welding (SAW), and electric arc (stick) welding. Specifically, for example, welding flash will generally protrude from a frictional weld into adjoining areas, and this flash may either be machined from accessible surfaces or it may be left in place in certain embodiments. As noted elsewhere herein, frictional welding flash may serve in certain embodiments to aid in securing a cast-in-place elastomeric seal in the seal retention groove without the need for bonding. If a different type of joining method (such as electron beam or electric arc welding) is employed, resulting in little or no welding flash protruding in the seal retention groove, then one or more serrations in one or both retention groove walls may be used to secure a cast-in-place seal as described above. For additional seal-securing action, frictional welding flash may be combined, in certain embodiments, with one or more groove wall serrations.

Second portion 30 is forged symmetrically about a second longitudinal axis z—z. Second portion 30 comprises a second disc-shaped body 39' having first and second opposing sides 65' and 66' respectively and flange region 36' adjacent to circular mating surface 34'. The first opposing side 65' of second disc-shaped body 39' comprises corresponding circular mating surface 34'. Surface 34' corresponds to (i.e., is sized and shaped to allow substantially complete contact with) circular boss mating surface 24'. Note that circular mating surfaces 24' and 34' in near-net-shape portions 20 and 30 may or may not be machined before the portions are joined. Machining the mating surfaces before joining would generally reduce the energy required for a frictional weld and would also reduce the amount of welding flash produced during frictional welding.

First opposing side 65' also comprises coaxial symmetrical depression 33 and one of two opposing integral seal retention groove walls, groove wall 31'. A second guide stem 37' extends from second opposing side 66' of second disc-shaped body 39', extending away from circular depression 33 along longitudinal axis z—z. Note that as discussed above, symmetrical depression 33 (or an analogous space) may or may not be present in alternative embodiments of valve bodies of the invention when cylindrical space 23 (or an analogous space) is also present. Note also that primes on labels such as groove wall 31', second guide stem 37', and flange region 36' denote the respective structures prior to finish machining.

Figure 2B:
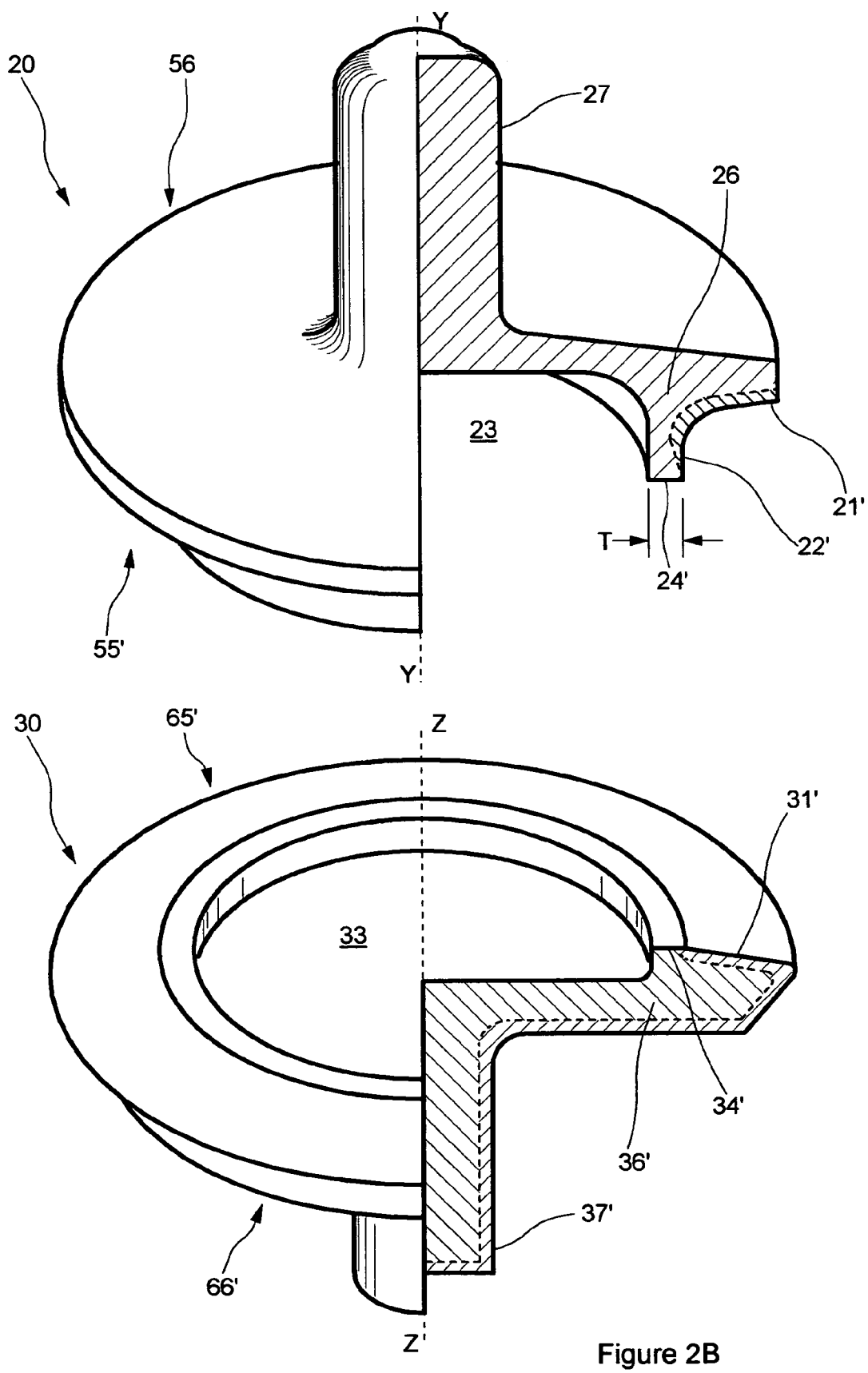
FIG. 2B schematically illustrates partial cross-sections showing first and second portions of a valve body prior to joining of the portions as in FIG. 2A, except that finish machining has been applied to the upper part and periphery of the first portion, including the guide stem.
Figure 2C:
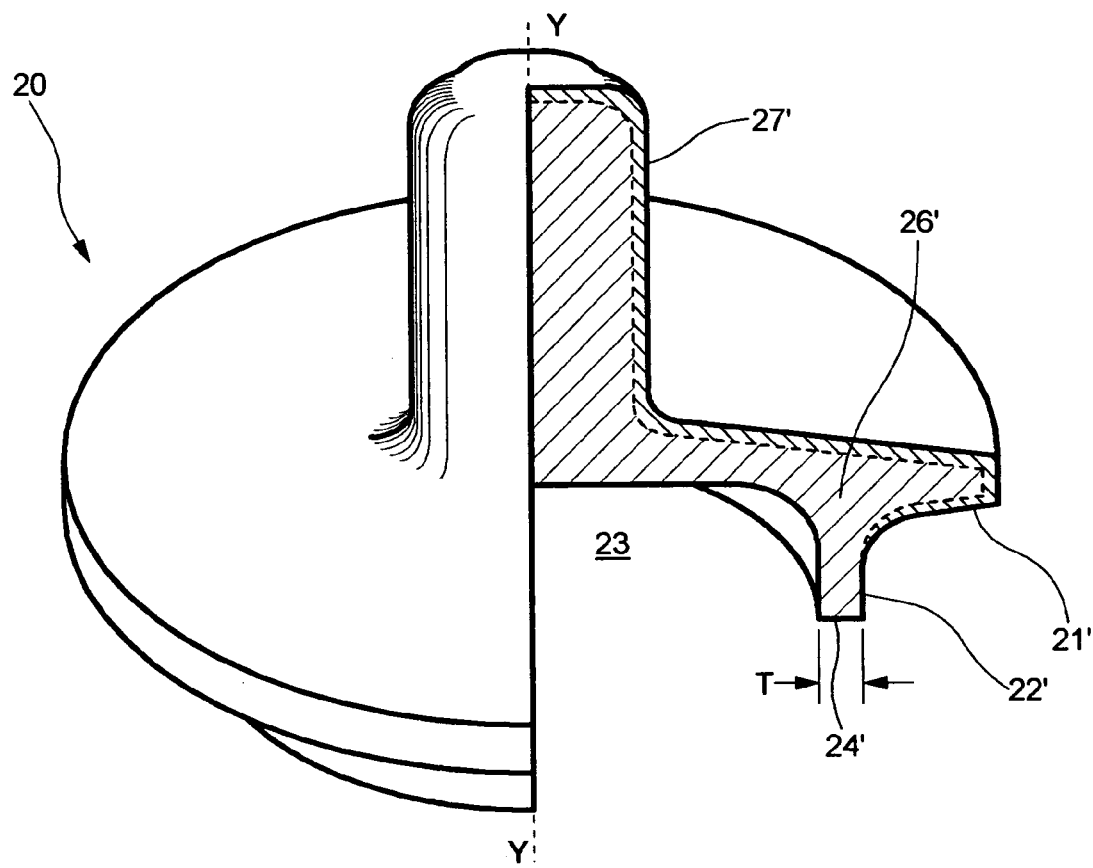
FIG. 2C schematically illustrates partial cross-sections showing first and second portions of a valve body prior to joining of the portions as in FIG. 2B, except that finish machining has been applied additionally to areas of the second portion that will form part of the seal retention groove.
Figure 2C:
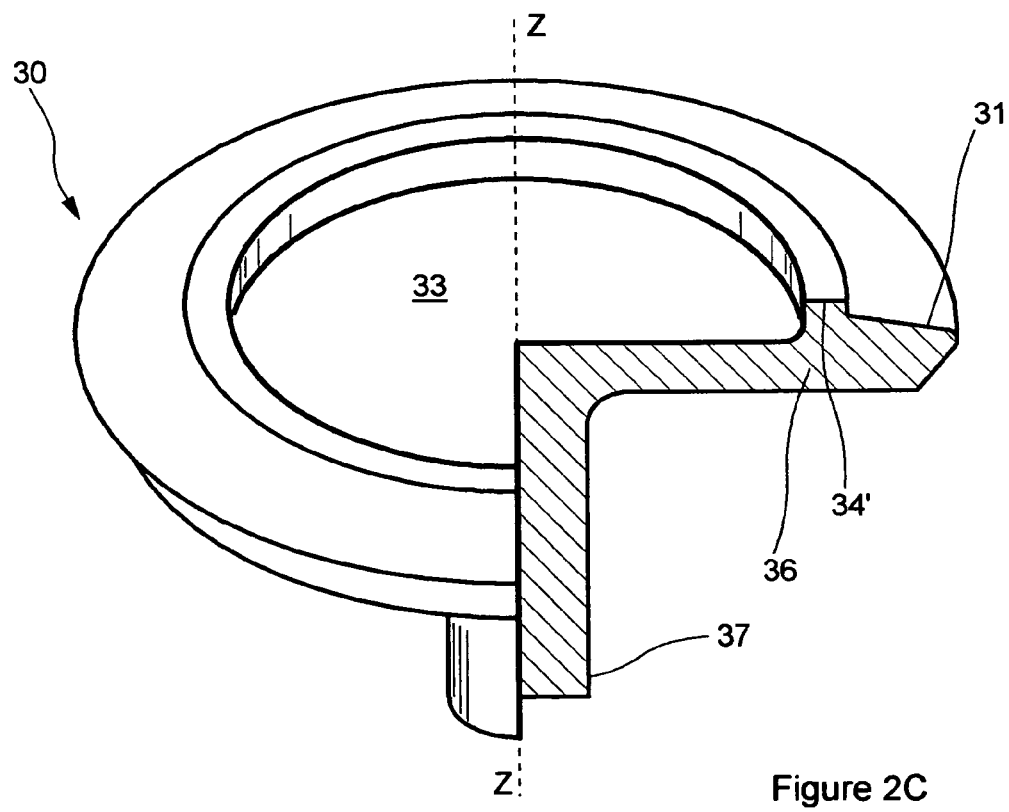
Figure 2D:
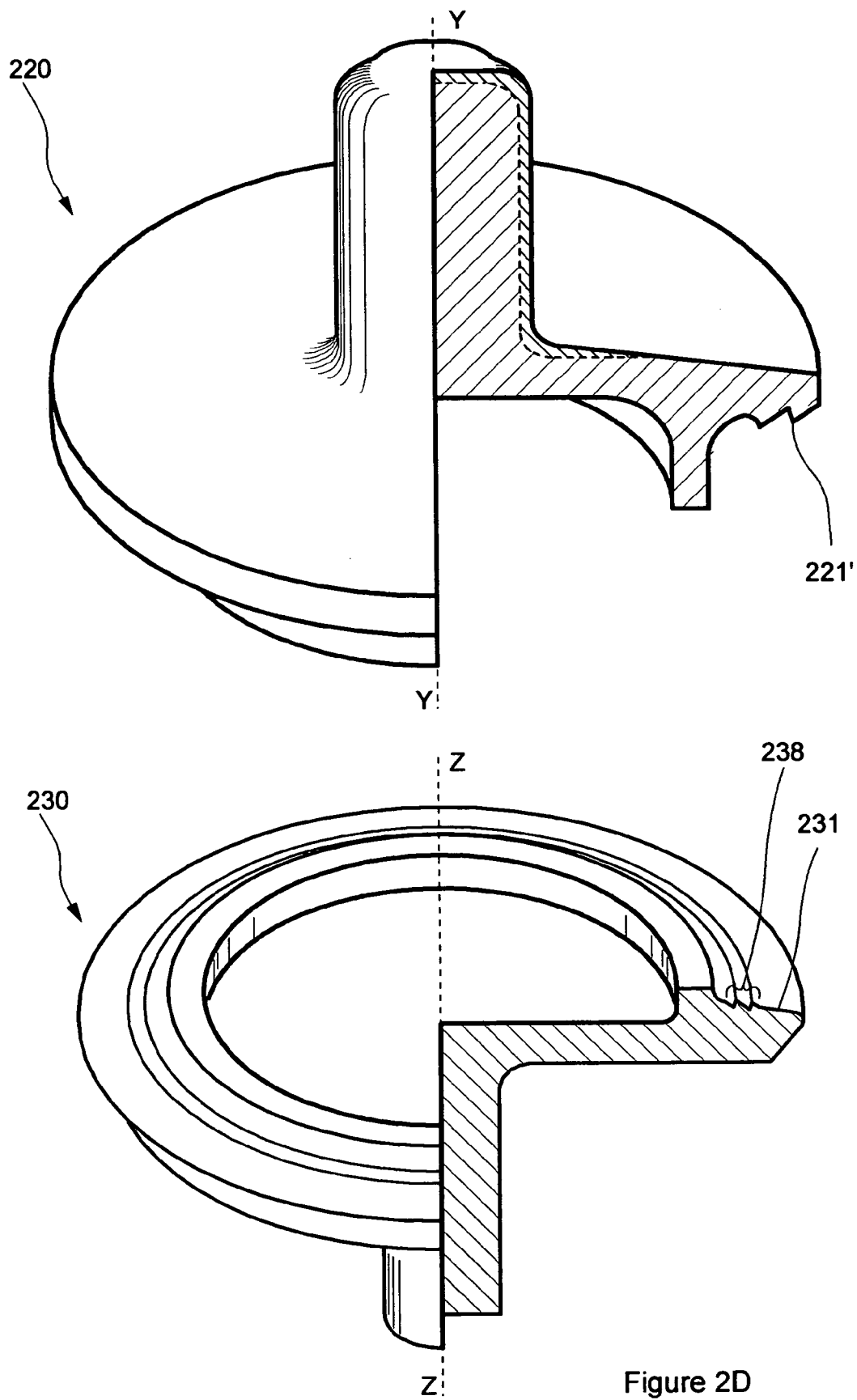
FIG. 2D is similar to FIG. 2C except that it schematically illustrates a valve body portion that incorporates seal retention wall serrations that are formed by forging or casting as well as a valve body portion that incorporates serrations that are formed by finish-machining.
Figure 2E:
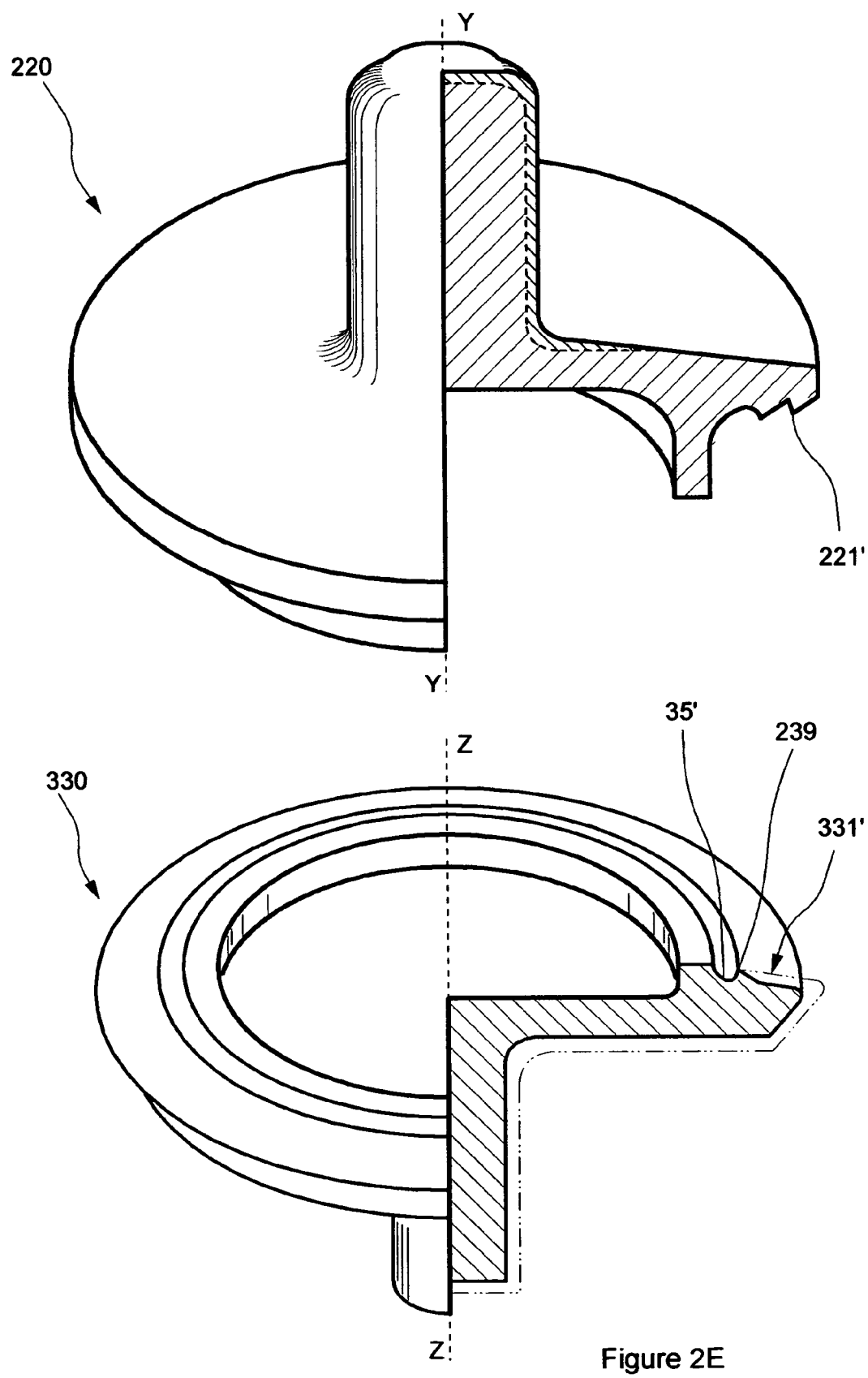
FIG. 2E is similar to FIG. 2C except that it schematically illustrates a valve body portion that incorporates seal retention groove wall serrations that are formed by forging or casting as well as a valve body portion that incorporates serrations that are formed by a combination of finish-machining involving a structural feature that was earlier formed by forging or casting.
Figure 2F:
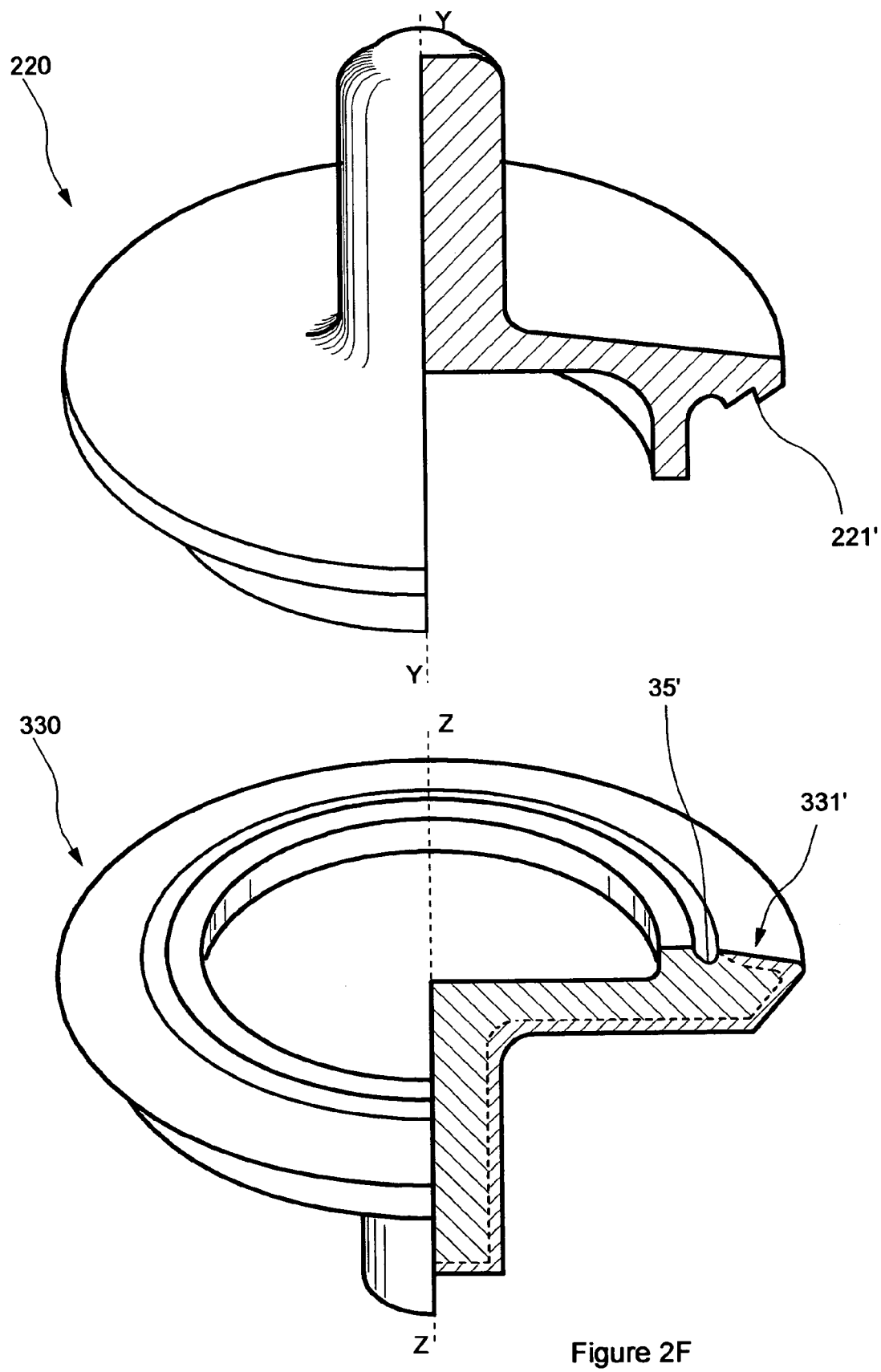
FIG. 2F is similar to FIG. 2B except that FIG. 2F schematically illustrates two valve body portions that incorporate seal retention wall serrations that are formed by forging or casting during the formation of each portion.

In various valve body embodiments certain finish machining steps may preferably be performed either before or after joining of first and second portions. For example, in a finished valve body the longitudinal axes of symmetry of first guide stem 27 and second guide stem 37 (see FIG. 8A) are necessarily colinear, thus forming the longitudinal axis of symmetry of the finished valve body. Because of slight misalignment of these two axes which might become apparent after joining of the first and second portions, it may be preferable not to finish machine both guide stem 37 and guide stem 27 before the portions are joined. By delaying finish machining of one or both of the first and second guide stems until after joining of the first and second portions, any slight misalignment of either guide stem axis that becomes apparent after joining can be corrected in the finished valve body. For example, FIG. 2B schematically illustrates that final machining of guide stem 27 and side 56 (including the periphery of portion 20 and flange region 26) has been accomplished prior to mating of the first and second portions in preparation for joining, whereas guide stem 37' remains near-net-shape (that is, not finish machined) until after joining. FIG. 2F is similar to FIG. 2B but differs in several respects. For example, FIG. 2F schematically illustrates a portion 220 in which serrations 221' are forged or cast during the formation of portion 220 itself by forging or casting respectively. As indicated in FIG. 2F, serrations 221' in this embodiment require no finish machining to accomplish their intended function of aiding retention of a cast-in-place elastomeric seal in the retention groove without the necessity of a bonding agent between seal and groove. Additional differences between FIGS. 2B and 2F are seen in portion 330 (see FIG. 2F) which includes a groove 35' that is forged or cast in portion 330 as the portion is being formed. This groove 35', which is not present in FIG. 2B, is located in the (unmachined) seal retention groove wall 331' (see FIG. 2F).

A part of groove 35' will form part of a seal retention groove wall serration after machining as described below.

Where precise alignment of machined surfaces on the first and second portions is less critical, as in the opposing walls of a seal retention groove for a seal that is to be cast and cured in place, finish machining of the groove walls may be accomplished before the joining of the first and second portions of a valve body. On the other hand, where seal retention groove dimensions are critical, as in the spacing of opposing walls of a groove for a snap-on seal, finish machining of at least one groove wall must be delayed until after the first and second portions are joined. When the first and second portions can be handled individually, surfaces that can be machined before joining are preferably machined then because they are more readily accessible than they would be after joining. This easy access means quicker machine set-up times and reduced machining costs. For example, FIG. 2C schematically illustrates final machining of certain surfaces (including guide stem 37 and groove wall 31) prior to joining of the first and second portions, leaving final machining of other surfaces (as, for example, of guide stem 27' and groove wall 21') to be completed after joining. Because of its proximity to mating surface 34' (where welding flash may be present after joining) the adjacent area of groove wall 31 is more accessible for any desired final machining prior to joining of the first and second portions than it would be after joining. FIGS. 2D and 2E are similar to FIG. 2C except that they each schematically illustrate a portion 220 that incorporates serrations 221' that are formed (as by forging or casting) but not finish-machined either before or after joining of first and second portions to form a valve body. See the above discussion relating FIG. 2F to FIG. 2B. Additional differences from FIG. 2C that are present in FIG. 2D include the presence of machined serrations 238 on seal retention groove wall 231. In the embodiment of FIG. 2D, serrations 238 are machined prior to joining of portions 220 and 230 for form a valve body. FIG. 2E schematically illustrates yet another embodiment in which groove 35' is first formed in seal retention groove wall 331' by forging or casting, and then serration 239 is formed (in part by groove 35') by finish machining as indicated by the broken line. The finish machining may be accomplished either before or after joining the two valve body portions to form a valve body.

Thus, serration 239 differs from serrations 238 in that serration 239 in seal retention groove wall 331 comprises a combination of as-forged and as-machined surfaces, or a combination of as-cast and as-machined surfaces, depending on whether groove 35' was earlier formed by forging or casting respectively. On the other hand, serrations 238 in seal retention groove wall 231 comprise as-machined surfaces but no as-forged or as-cast surfaces. Note that some of the serrations shown in FIGS. 2D, 2E and 2F, being formed by forging or casting but not by finish machining, are illustrated larger than serrations formed by finish machining. This is because forging (in particular) can not achieve the finer surface detail that is possible with finish machining.

To make a valve body, first portion 20 is joined to second portion 30, preferably with a weld at the junction of mating surface 24' of cylindrical boss 22' and corresponding mating surface 34'. Note that both cylindrical boss mating surface 24' and corresponding mating surface 34' are surfaces of substantially identical dimensions and complementary shape, so that the two mating surfaces may be brought into substantially complete contact with each other to form a circular contact area. After joining of the first and second portions 20 and 30 respectively (as, for example, by frictional welding), any necessary finish machining (for example, that of one or both guide stems and/or parts of seal retention groove 11) is completed as needed to produce a finished valve body 10.

Figure 5A:
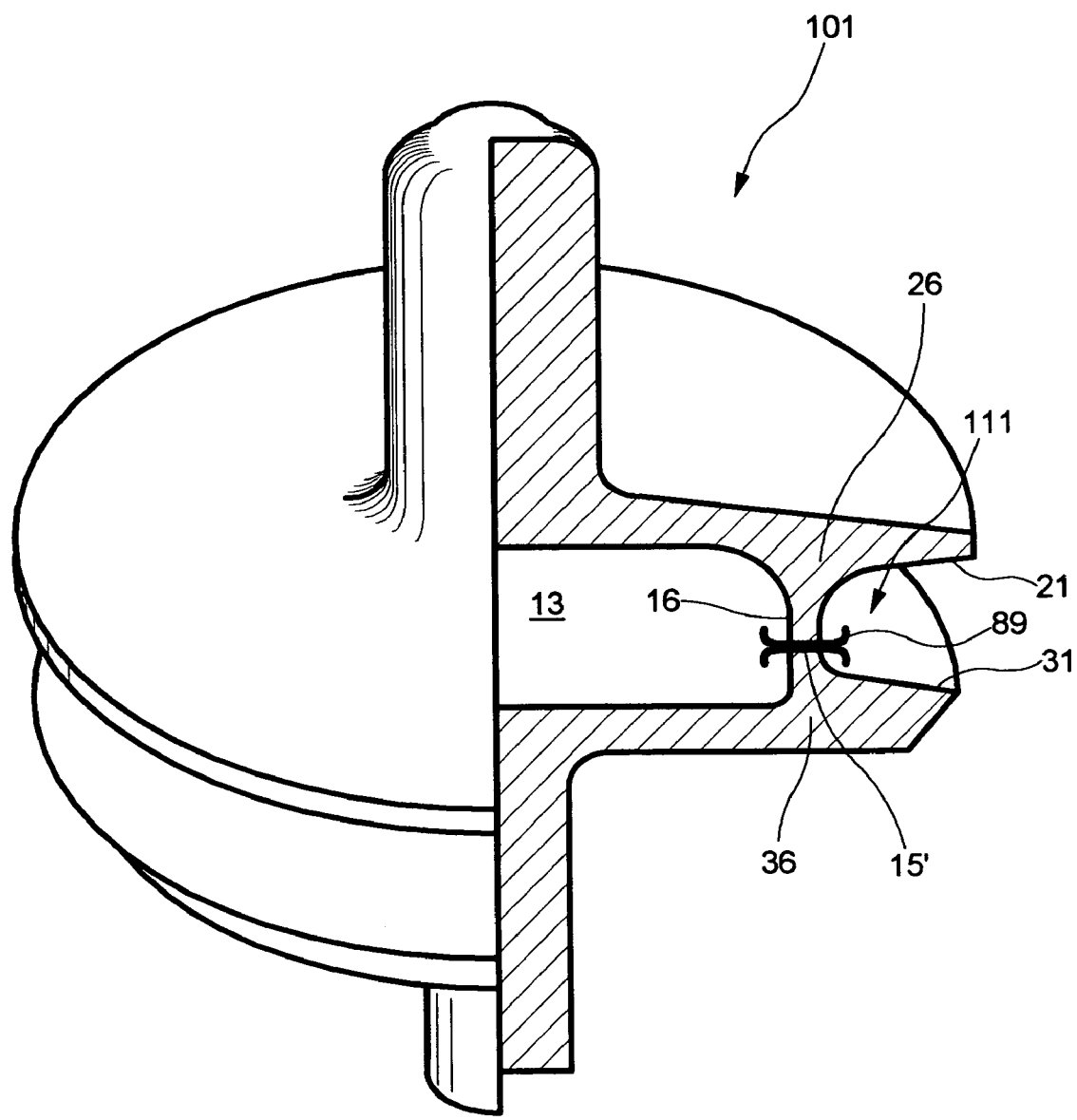
FIG. 5A schematically illustrates a partial cross-section of the valve body of FIG. 4A after machining to a final desired shape; the valve body totally encloses a hollow.

Structures in the finished valve body 101, as illustrated and labeled in FIG. 5A, are formed as follows. Cylindrical boss 22 on first portion 20 will form part of a cylindrical web 16 which, in turn, will form the part of the wall of the integral seal retention groove 111 that is closest to the valve body's longitudinal axis of symmetry (i.e., that part of the groove wall which lies between and connects its two opposing walls 21 and 31; the part of portion 20 labeled 21' in FIGS. 2A, 2B and 2C will form part of a first opposing wall, labeled 21 in FIG. 5A because it is a finished machined part of integral seal retention groove 111. The part of portion 30 labeled 31' in FIGS. 2A and 2B will form part of a second opposing wall, labeled 31 in FIG. 5A because it is a finished machined part of integral seal retention groove 111. And the hollow 13 (labeled in FIG. 5A) will be substantially formed from the combination of cylindrical space 23 and circular depression 33 shown in portions 20 and 30 respectively in FIGS. 2A, 2B and 2C. Note that finished valve body 101 in FIG. 5A is similar to finished valve body 10 in FIG. 1 except that welding flash 89 protrudes into seal retention groove 111 of valve body 101, whereas there is no such protrusion into seal retention groove 11 of valve body 10.

In making embodiments of a valve body for applications where fatigue failure is a dominant concern, portions 20 and 30 are preferably both forged. In alternative embodiments, one portion may be cast while the other is forged. While forging imparts a desirable grain structure to metal, making it relatively resistant to failure under repeated impact loads, casting may be more suitable than forging for manufacturing relatively complex shapes. Embodiments of the invention in which both portions 20 and 30 are forged are suitable for applications requiring excellent impact resistance, whereas a combination of desired characteristics (such as good impact resistance with a relatively complex functional shape) can be achieved when one of the portions 20 and 30 is forged and the other is cast.

FIG. 3 schematically illustrates inertia wheels 40 and 42 being coupled to portions 20 and 30 respectively and rotating as indicated to establish relative motion between portions 20 and 30 where the portions' corresponding mating surfaces contact at 15' (which will be the site of a frictional weld, from which welding flash will protrude into hollow 13 and into seal retention groove 11). Note that relative motion may be established as indicated by counter-rotation of inertia wheels 40 and 42, or by one inertia wheel rotating faster than the other but in the same direction, or by one inertia wheel being stopped and the other one rotating. Note further that portions 20 and 30 may also be joined by any other suitable method known to those skilled in the art. Such methods include electric arc welding or electron beam welding or any other method which, after finish machining, results in a junction 15' (as seen, for example, in FIG. 5A) having sufficient strength to maintain the integral character of the seal retention groove in use.

Figure 4A:
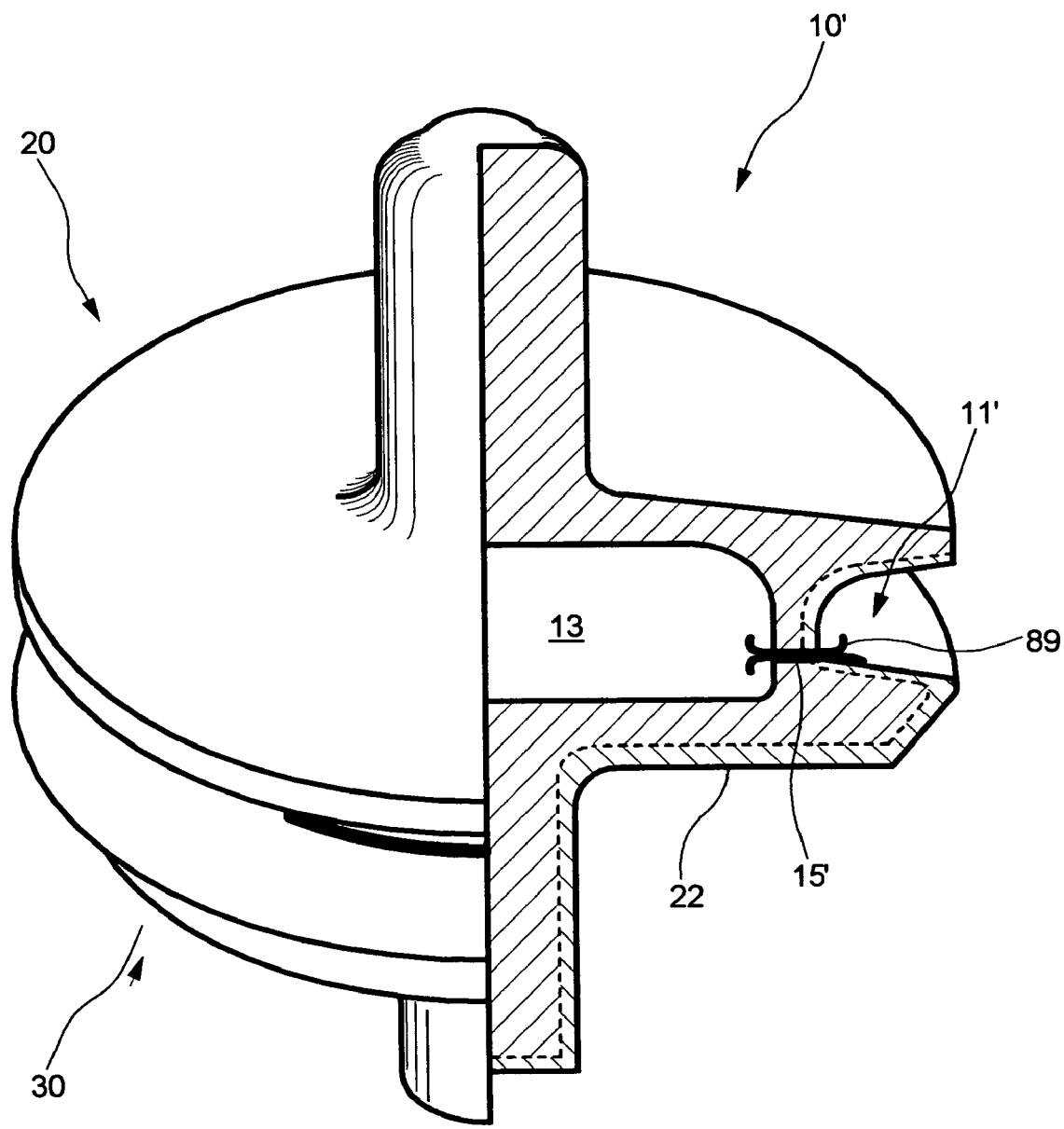
FIG. 4A schematically illustrates a partial cross-section of the two portions shown in FIG. 3 welded together to form a near-net-shape valve body.
Figure 4B:
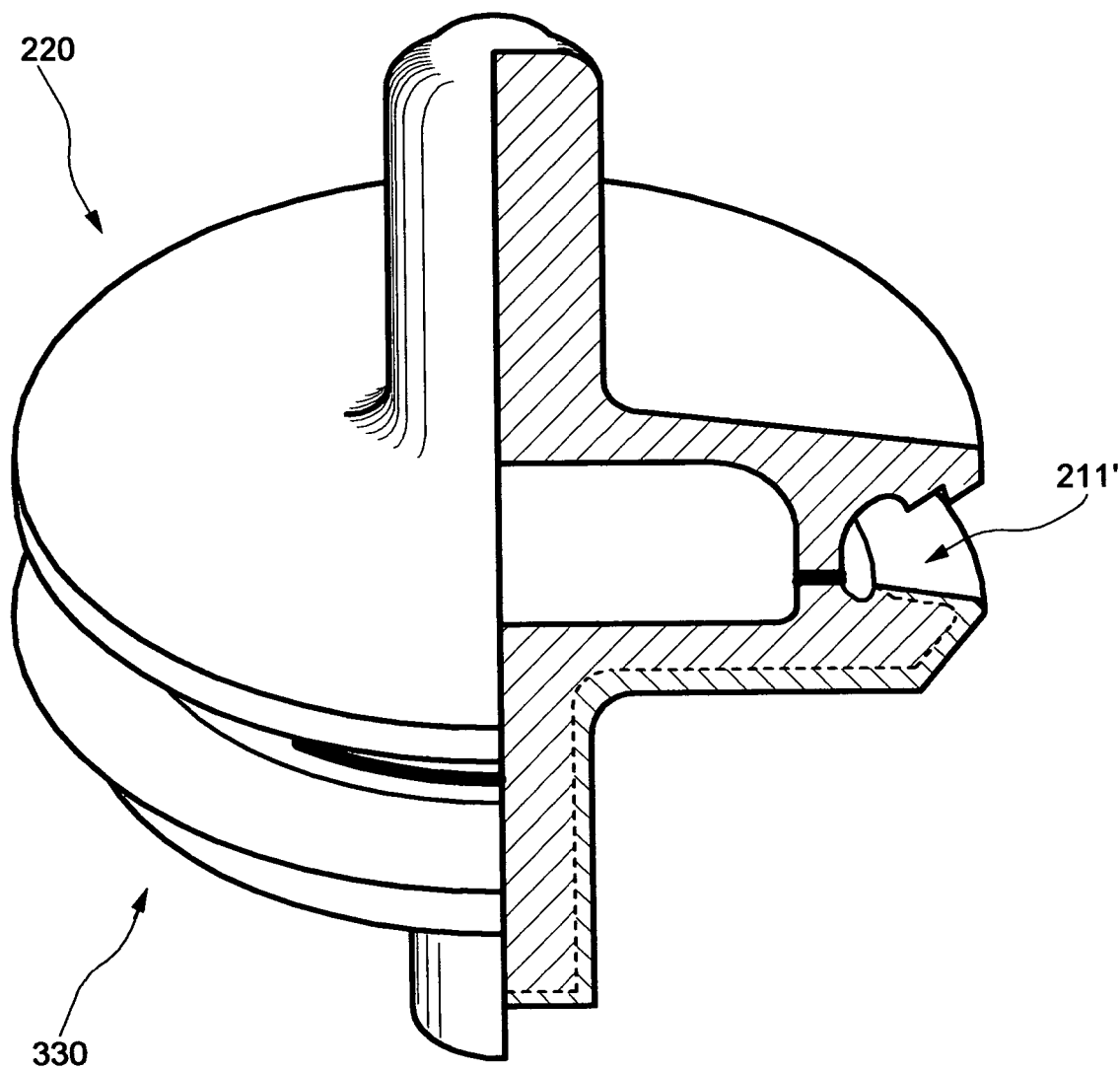
FIG. 4B schematically illustrates a partial cross-section of a valve body comprising the valve body portions illustrated in FIG. 2E.
Figure 8A:
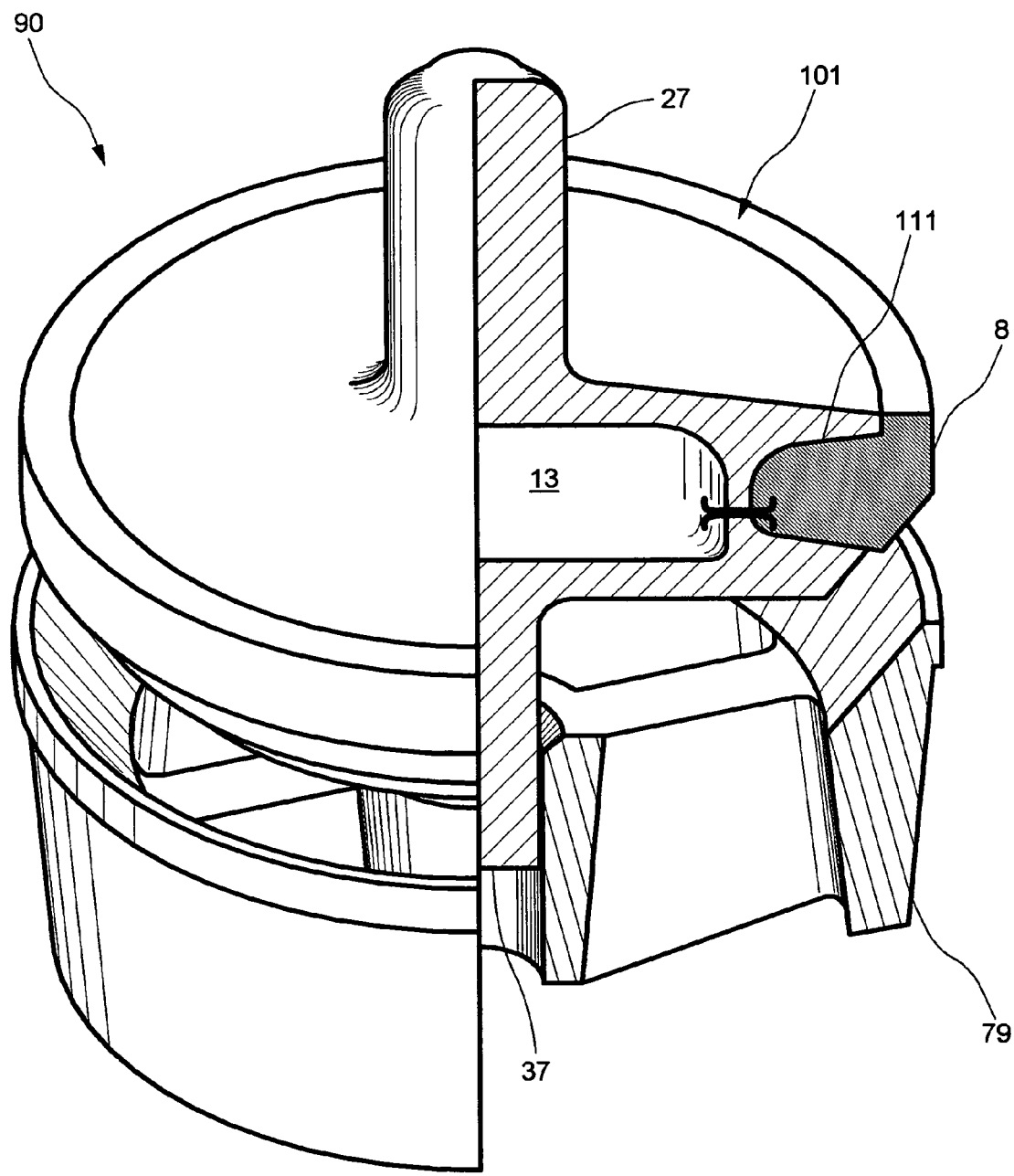
FIG. 8A schematically illustrates a valve assembly comprising a 4-web valve seat and a stem-guided valve body. An elastomeric seal is shown cast within the integral seal retention groove of the valve body without a bonding layer between the seal and the groove.
Figure 8B:
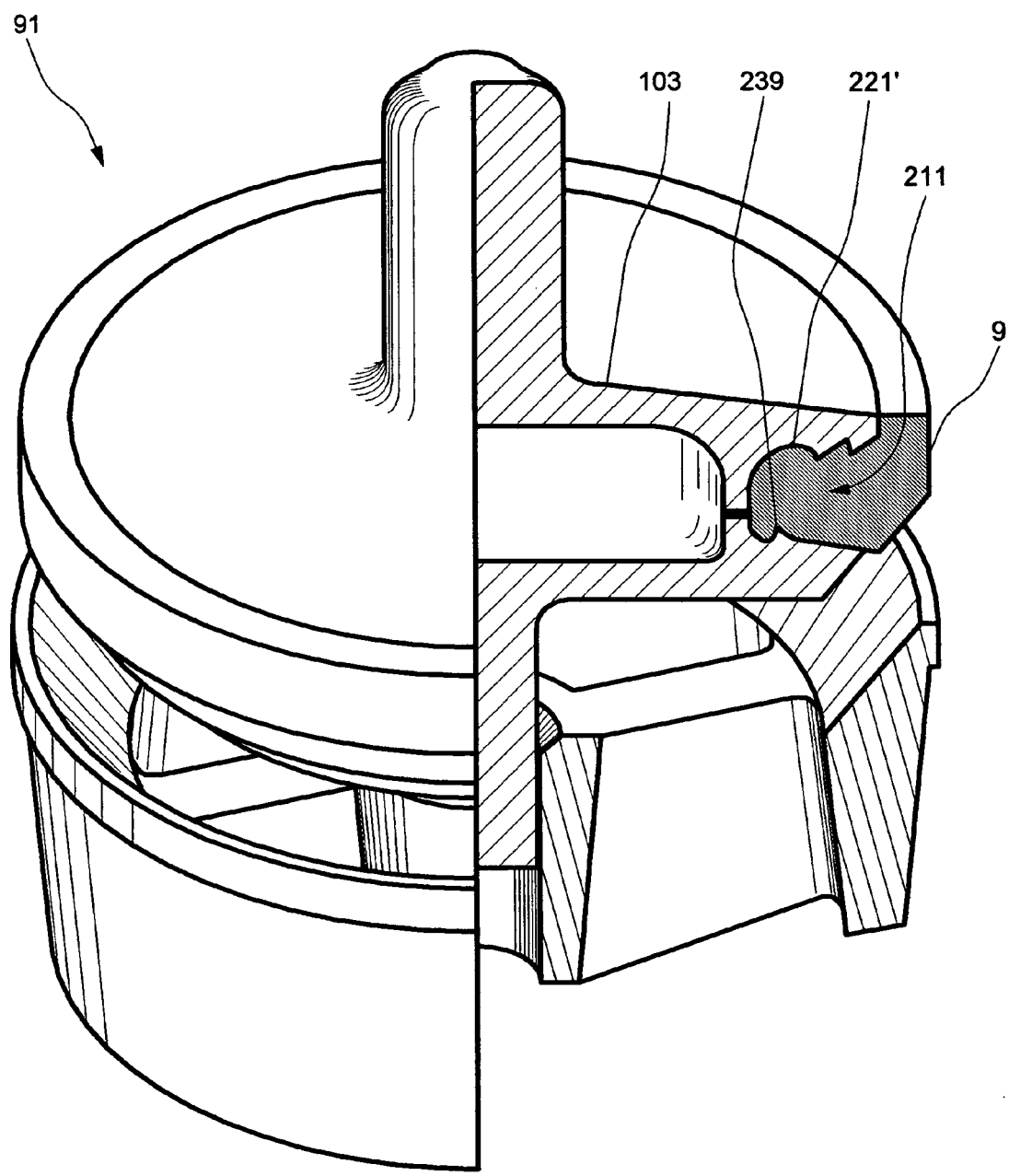
FIG. 8B schematically shows how, after finish machining as indicated by the dotted line in FIG. 4B, the lower seal retention groove wall will comprise a serration that acts in conjunction with serrations on the upper seal retention groove wall to retain a cast-in-place elastomeric seal in the seal retention groove without the need for bonding.

FIG. 4A schematically illustrates a partial cross-section showing weld 15' joining portions 20 and 30 to form near-net-shape valve body 10'. Valve body 10' comprises a hollow 13 and a near-net-shape integral seal retention groove 11' into which welding flash 89 protrudes. The dashed line in the cross-sectional view schematically demarcates the reverse cross-hatched area 22 which indicates material (including welding flash 89) that will be removed during final machining to form a finished valve body 10 as shown in FIG. 1. Since the welding flash, if present, can act to secure a cast-in-place elastomeric seal in a seal retention groove, embodiments of the invention from which the welding flash has been removed may incorporate at least one serration in at least one groove wall for securing a cast-in-place seal in the groove without the necessity of a bonding agent between seal and groove. FIG. 4B schematically illustrates a valve body 103 comprising the portions 220 and 330 illustrated in FIG. 2E joined and partially machined, the two joined portions forming seal retention groove 211'. FIG. 8B schematically illustrates valve body 103 after finish machining as a component of a valve assembly 91, showing how, after finish machining as indicated by the dotted line in FIG. 4B, the lower wall of seal retention groove 211 will comprise a serration 239 that acts in conjunction with serrations 221' on the upper seal retention groove wall to retain a cast-in-place elastomeric seal 9 in the seal retention groove without the need for bonding. Note that because of the lack of bonding, the above serrations allow small relative movements of an elastomeric seal with respect to the groove wall during the elastomer shrinkage associated with seal curing and also during valve operation. Such small movements redistribute stress within the seal elastomer and thus tend to temporarily relieve areas of relatively high stress (e.g., when the seal elastomer is distorted as the valve is closing). These small movements are limited by the serrations, which function to return the seal to its lowest-stress position in the groove (e.g., the position occupied when the valve is open) after a high-stress interval (i.e., an interval in which the seal is distorted) has passed. The small movements of an elastomeric seal relative to its groove are generally sliding movements, but separations of the seal and portions of the valve body groove occur, for example, as the seal changes its shape (due to the generally anisotropic seal shrinkage associated with curing of the seal elastomer). Temporary separations of portions of the seal from the valve body groove also occur as the seal is periodically distorted when the valve body is in use (e.g., especially during rapid open-close cycling).

Figure 5B:
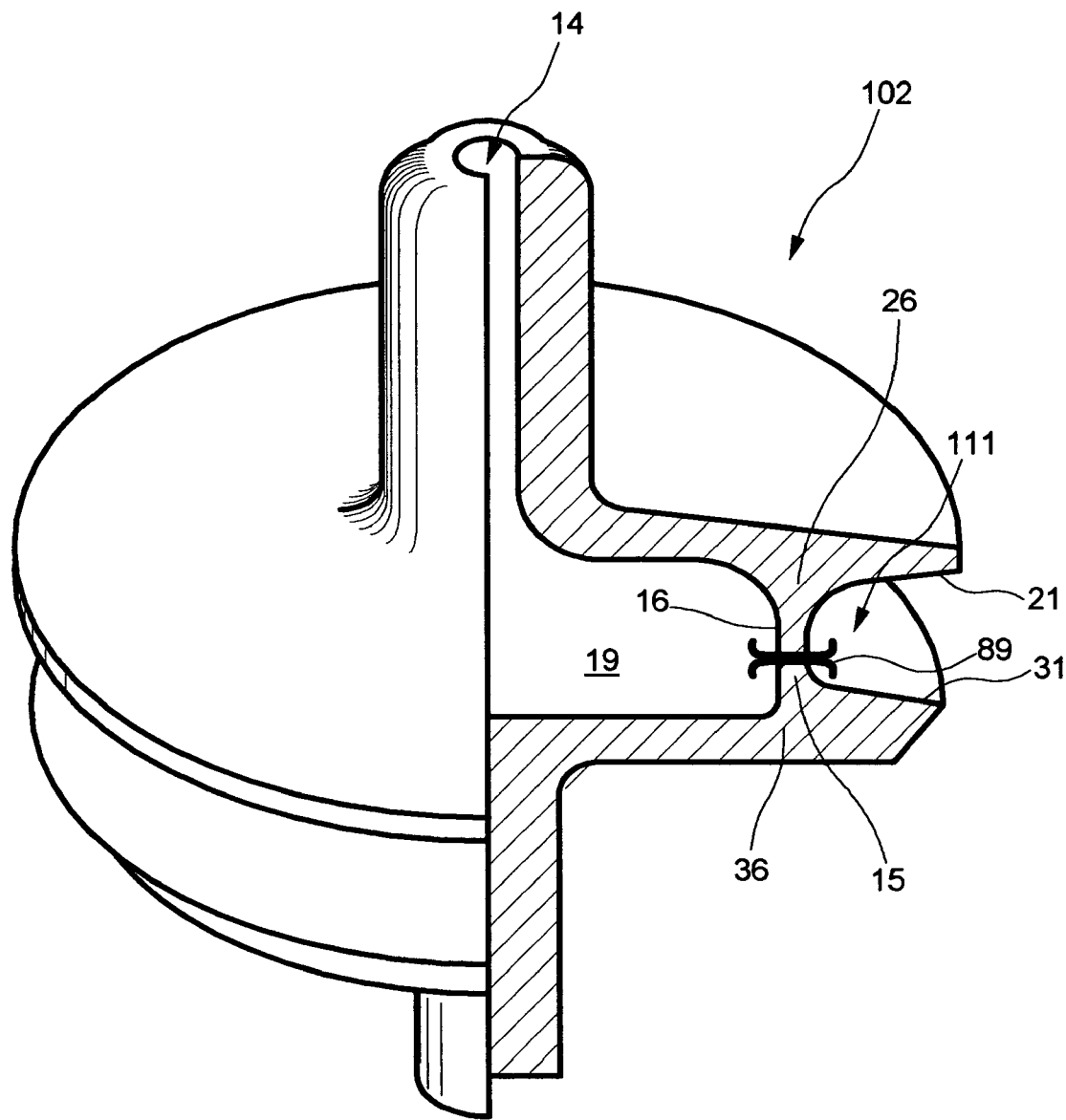
FIG. 5B illustrates a schematic view with partial cross-section of an alternative embodiment of the valve body shown in FIG. 5A; the illustrated hollow is not totally enclosed but instead has fluid communication with space outside the valve body.

Note that although hollow 13 is shown totally enclosed by portions 20 and 30 and weld 15', communication between space outside valve body 10' and an interior hollow may exist in other embodiments as schematically illustrated by the example in FIG. 5B.

The view of valve body 101 in FIG. 5A schematically illustrates opposing walls 21 and 31 of seal retention groove 111 after machining to final shape. Junction 15' is part of cylindrical web 16, but its accompanying welding flash 89 is not finish machined at all in the otherwise finish machined valve body 101 in FIG. 5A. Instead, the welding flash 89 remains extruded into seal retention groove 111 and hollow 13. When the embodiment of FIG. 5A is to be produced, opposing wall 31 of seal retention groove 111 is preferably finish machined before joining of portions 20 and 30. The continued presence of welding flash 89 in groove 111 after joining would complicate any finish machining of opposing wall 31' that might be attempted after joining.

Welding flash 89 comprises a relatively small amount of exceptionally hard, rough metal, often of convoluted shape, that lies adjacent to mating surfaces after the surfaces are joined together by welding. Consequently, welding flash generally protrudes from the weld junction of portions 20 and 30 into the adjacent integral seal retention groove. Further, welding flash is relatively difficult to remove from the groove, even after heating of the valve body in an annealing furnace.

Figure 10:
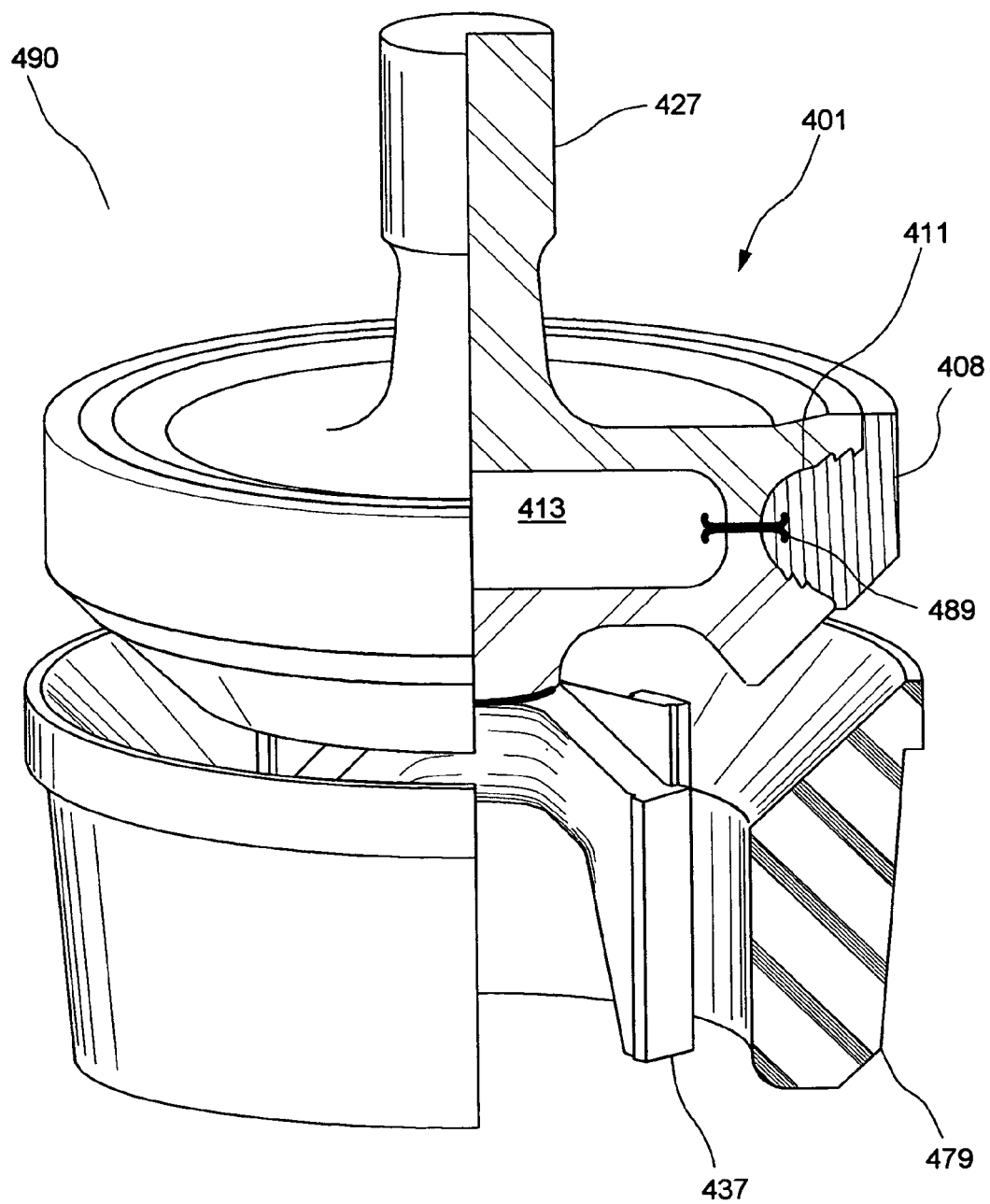
FIG. 10 schematically illustrates a valve assembly comprising a full-open valve seat and a valve body having a top guide stem and a bottom crow-foot guide. An elastomeric seal is shown cast within the integral seal retention groove of the valve body.
Figure 11:
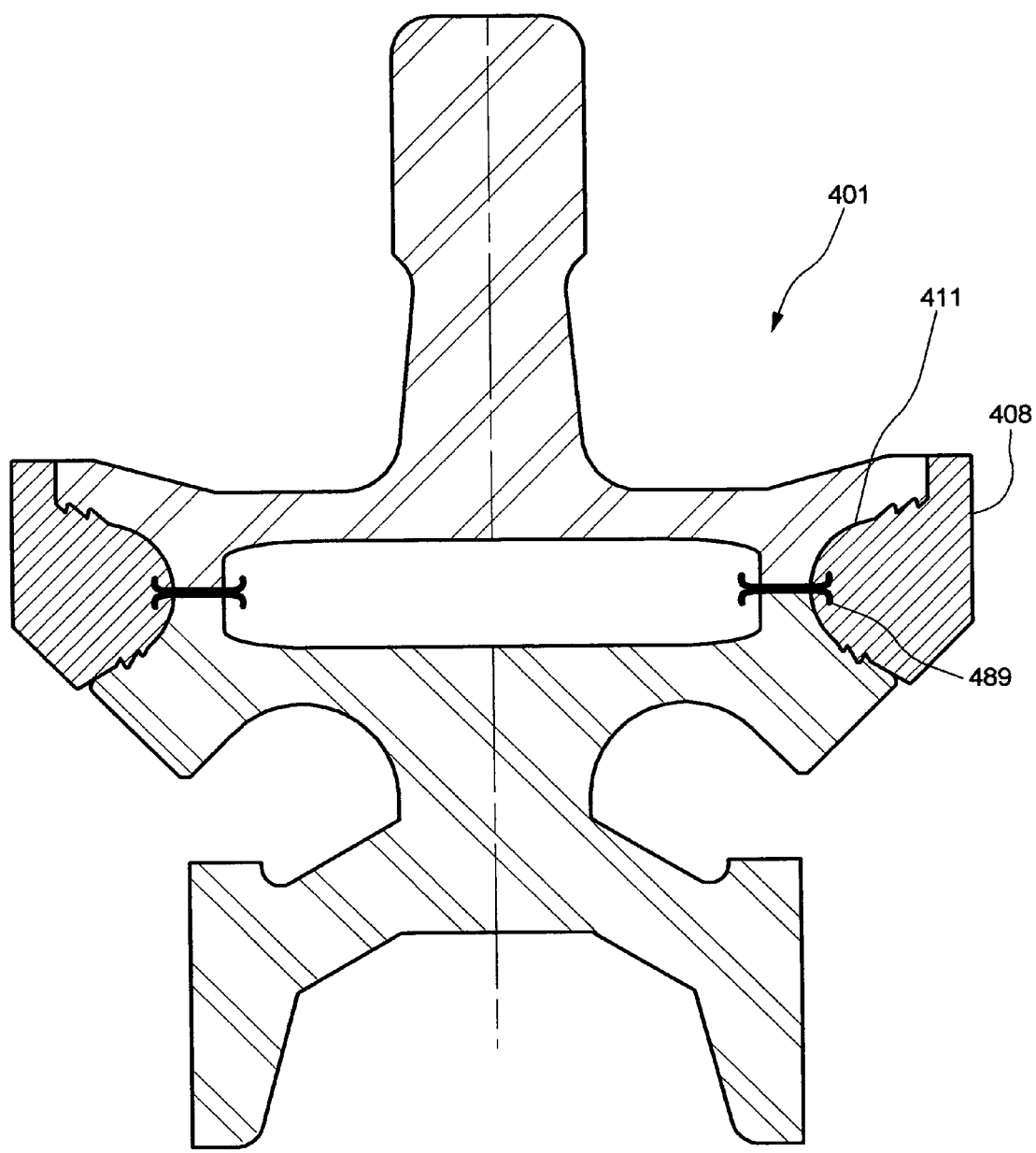
FIG. 11 schematically illustrates a cross-section of the valve body with cast-in-place elastomeric seal seen in FIG. 10.

The presence of welding flash in a seal retention groove increases the difficulty of properly fitting a snap-on elastomeric seal ring into the groove. Thus, for example, when valve body 101 is fitted with an elastomeric seal 8 (as shown in FIG. 8A) or an elastomeric seal 408 (as shown in FIGS. 10 and 11), an elastomer is preferably cast and cured in place within the seal retention groove (i.e., seal retention groove 111 in FIG. 8A or seal retention groove 411 in FIGS. 10 and 11). The welding flash 89 that protrudes into seal retention groove 111, as in FIG. 5A and FIG. 8A is analogous to the welding flash 489 that protrudes into seal retention groove 411, as in FIGS. 10 and 11. In either case, the welding flash will simply be enveloped by the elastomer as a seal 8 (as shown in FIG. 8A) is being cast in place in the groove 111, or as a seal 408 (as shown in FIGS. 10 and 11) is being cast in place in the groove 411. After curing of the elastomeric seal, the welding flash will be tightly coupled to the seal elastomer because of the irregular convoluted shape of the flash. Thus, the portion of the cured seal adjacent to the welding flash is firmly anchored within the seal retention groove. But because of the elastic properties of the seal elastomer, portions of the seal that are not adjacent to the welding flash may experience small relative movements of the seal with respect to the groove. These small movements (including small separations of the seal from the valve body) are limited by the seal's relatively tight coupling to the welding flash and also by the seal's generally sliding coupling to any serrations that may be present in certain embodiments. Such limitations on relative movement of a seal in its groove, in conjunction with internal stress relief in the seal elastomer provided via the movement, make leaks and/or premature seal failure less unlikely.

Valve body 102 in FIG. 5B is similar to valve body 101 as shown in FIG. 5A except for the presence of longitudinal fluid passage 14 which allows fluid communication between space outside valve body 102 and interior hollow 19. The presence or absence of such communication is important, for example, during heat treatment (carburization) to harden certain surfaces of a valve body for increased wear resistance.

Carburized metal is harder but less ductile compared to metal that is not carburized. Carburizing involves infusing gaseous carbon into valve body surfaces over several hours in a furnace. The valve bodies are then quenched and tempered to produce a very hard and wear-resistant case on surfaces exposed to carburizing furnace gases. The hardened case is strong and relatively brittle, but the metal underlying the hardened case remains more ductile and therefore better able to resist fatigue cracking.

Figure 6:
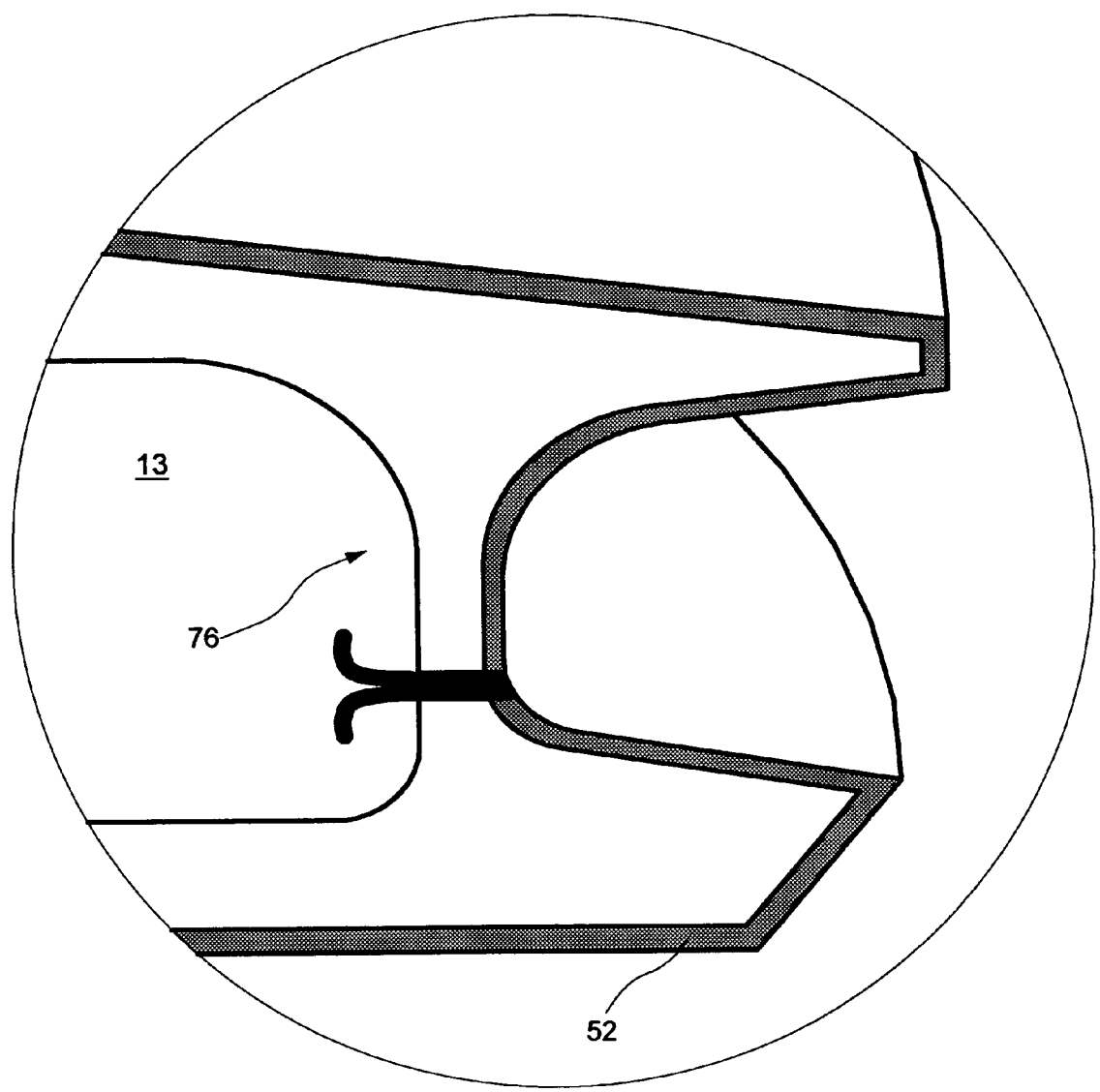
FIG. 6 schematically illustrates effects of carburization on surfaces of a valve body having a totally enclosed hollow.

During heat treatment of valve body 10 as shown in FIG. 1, carburization of interior surfaces of the totally-enclosed hollow 13 will not take place due to the absence of fluid communication between hollow 13 and space outside the valve body, including the gaseous carburizing agents in the heat treating furnace. In such a valve body, carburization will be limited to exterior valve body surfaces as schematically indicated by the crosshatched (carburized case) surface layer 52 in FIG. 6. Note that web 76 is carburized on one side only and that there is no welding flash protruding from the right side of web 76 into the seal retention groove, in contrast to the welding flash protruding from the left side of web 76 into hollow 13. The seal retention groove is thus configured to accept a snap-on elastomeric seal.

Figure 7:
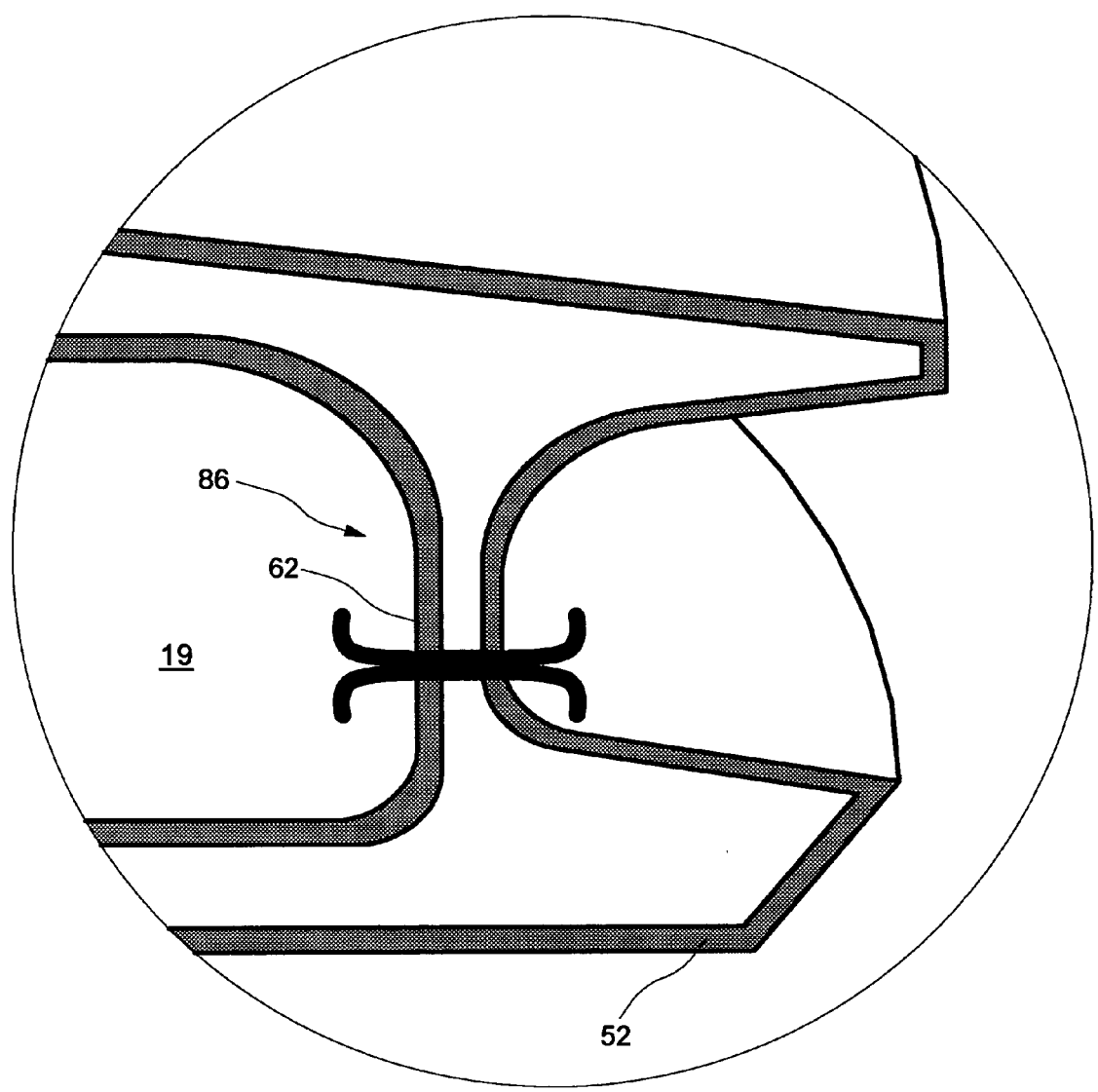
FIG. 7 schematically illustrates effects of carburization on surfaces of a valve body enclosing a hollow, wherein the hollow has fluid communication with space outside the valve body.

Conversely, carburization of valve body 102 as shown in FIG. 5B will result in carburization of interior surfaces bordering hollow 19 and longitudinal fluid passage 14. This condition is schematically illustrated in FIG. 7 wherein both an internal carburized surface layer 62 and an external carburized layer 52 are present on web 86. Note that one difference between hollow 13 in FIG. 6 and hollow 19 in FIG. 7 is the presence of internal carburized surface layer 62 enclosing hollow 19, whereas there is no such carburized layer enclosing hollow 13. Note also that welding flash 89 protrudes from the right side of web 86 into the seal retention groove, meaning that this embodiment is adapted for use with an elastomeric seal which is cast and cured in place in the seal retention groove.

In valve bodies where a cylindrical web may be carburized on one surface only (see, for example, the outer surface of web 76 in FIG. 6) or two surfaces (see, for example, the interior and outer surfaces of web 86 in FIG. 7), sufficient web thickness is provided to result in a minimum acceptable ratio of ductile metal thickness to carburized case depth of about 1:1. Note that two-surface carburization of web 86 as in FIG. 7 may be desirable for certain high-stress applications because the web 86 will have a "sandwich" structure with ductile metal serving to space apart two harder surface layers, imparting substantial resistance to crushing of the web 86 in axial compression. Where such crushing resistance is not required, one-sided carburization of the web 76 as in FIG. 6 may be used to avoid the extra cost of drilling or otherwise forming fluid passages analogous to longitudinal passage 14 in FIG. 5B.

Valve bodies of the invention are normally carburized to an effective case depth of about 0.06 to 0.08 inches. Carburization raises the carbon content of the valve body material, which for mild steel is initially about 0.2%. At valve body surfaces exposed to carburizing furnace gases, the carbon content of mild steel is preferably raised to about 1%. This level of carbon content decreases at deeper levels of the steel below the exposed valve body surfaces. Given a surface carbon content of about 1%, the depth into the steel underlying the exposed surface at which the carbon content decreases to about 0.5% is, by industry convention, called the effective case depth. In practice, the effective case depth would not be exactly constant over a heat treated valve body but would vary approximately ±10% about a set point due to manufacturing tolerances inherent in presently available carburizing furnaces. Hence, thicknesses specified for cylindrical webs in valve bodies of the invention are not exact values but instead reflect design objectives achieved through close control of variables in the carburizing process.

For the relatively small loads exerted on a cylindrical web in valve bodies of the invention, a minimum thickness of relatively ductile metal (i.e., metal not carburized to a carbon content greater than 0.5%) is equal to or greater than the greatest effective case depth measured on either side of the web. Therefore, assuming a one-sided carburization effective case depth of about 0.08 inches, the minimum thickness for cylindrical web 76 in a valve body having a totally enclosed interior hollow (and thus carburization on only one side of the web) will be about 0.16 inches. In contrast, assuming a carburization effective case depth of about 0.08 inches on each of two sides, the minimum thickness for cylindrical web 86 in a valve body having fluid communication between an interior hollow and space outside the valve body (and thus carburization on both sides of the web) will be approximately 0.24 inches (0.08 inches for the interior case thickness, plus 0.08 inches for the ductile core thickness, plus 0.08 inches for the exterior case thickness).

While minimum cylindrical web thickness is limited as described above, maximum web thickness is limited by the capacity of the apparatus used to join the portions of the valve body together (as, for example, by frictional or electron beam or electric arc welding). When using commercially available frictional welders having inertia wheels to join valve body portions, the practical upper limit on cylindrical boss wall thickness at the cylindrical boss mating surface in API size 7 valves is about 0.5 inches. Using frictional welders of larger capacity (or certain electric arc or electron beam welders) would allow this upper wall thickness limit to be raised.

FIG. 8A schematically illustrates a valve assembly 90 comprising a 4-web seat 79, a valve body 101, and an insert seal 8. Valve body 101 comprises a totally enclosed hollow 13, guide stems 27 and 37, an insert seal retention groove 111 into which welding flash 89 protrudes. Insert seal 8 is preferably cast and cured in place in seal retention groove 111 over welding flash 89 to reduce the incidence of seal leakage and out-of-round problems.

Figure 9:
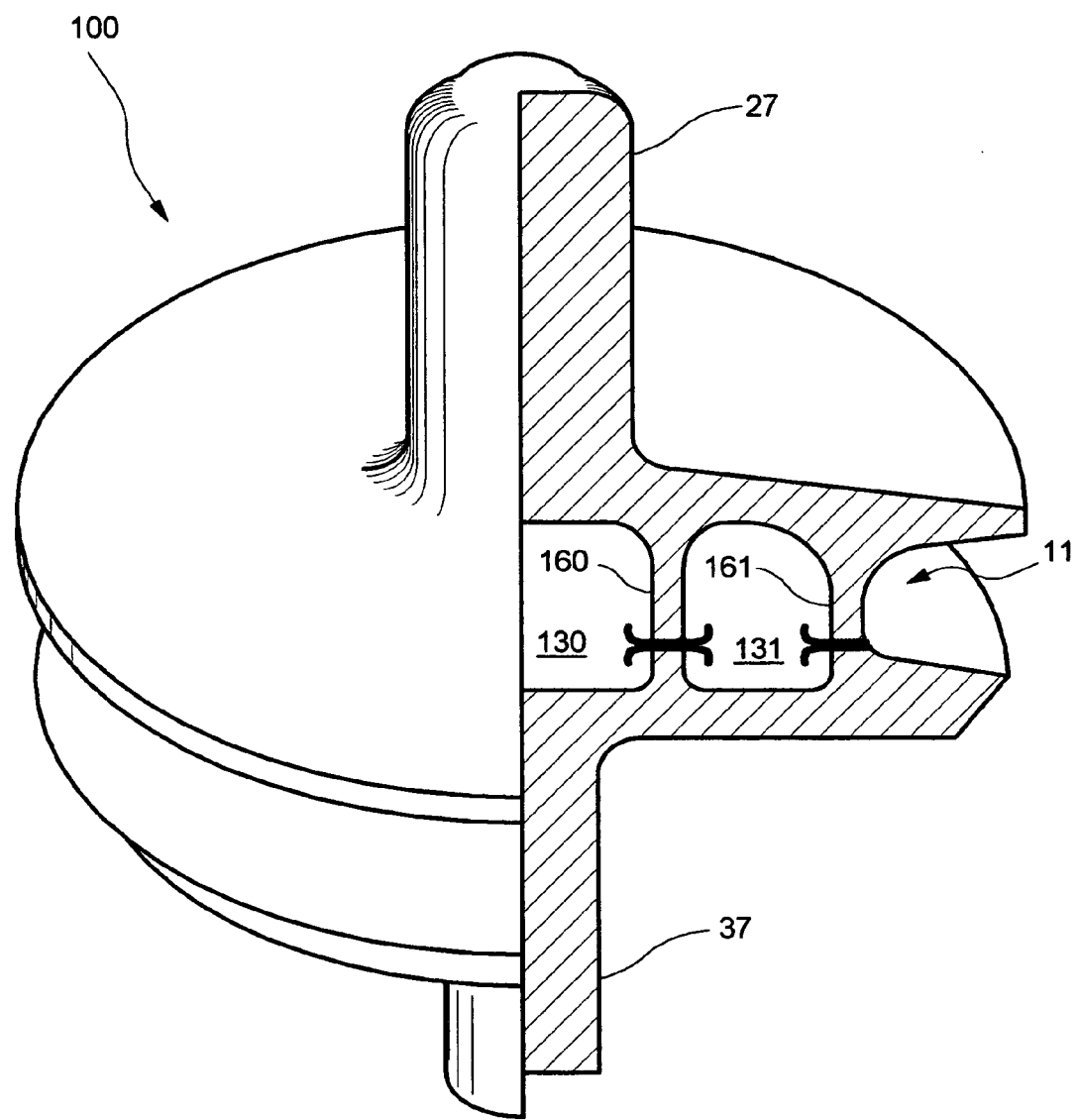
FIG. 9 illustrates a schematic view with partial cross-section of a valve body for use in web-seat, stem-guided valves; the valve body totally encloses a toroidal hollow and a concentric cylindrical hollow.

FIG. 9 schematically illustrates a schematic view with partial cross-section of valve body 100, which has the general outward appearance of valve body 10 in FIG. 1 but a different internal structure. The internal structure of valve body 100 comprises two concentric cylindrical webs, 160 and 161, a toroidal hollow 131, and a cylindrical hollow 130. Cylindrical webs 160 and 161 act as the webs of a box beam, as described above, to impart additional resistance to distortion about radial and/or tangential axes of valve body 100. Note that seal retention groove 11 in valve body 100 is smoothly finished (i.e., no welding flash protruding into the groove) and thus configured to accept a snap-on elastomeric seal.

FIG. 10 schematically illustrates a valve assembly 490 comprising a full-open seat 479, a valve body 401, and an insert seal 408. Valve body 401 comprises a totally enclosed hollow 413, a top guide stems 427, a bottom crow-foot guide 437, and an insert seal retention groove 411 into which welding flash 489 protrudes. Seal 408 is preferably cast and cured in place in seal retention groove 411 over welding flash 489 to reduce the incidence of seal leakage and out-of-round problems.

FIG. 11 schematically illustrates a cross-sectional view of valve body 401 as seen in FIG. 10. The symmetry of structures such as seal retention groove 411, welding flash 489, and seal 408 about the longitudinal axis of valve body 401 is shown.

What is claimed is:

1. A valve body for use in a full-open seat, stem-guided valve, the valve body comprising:
   first and second portions symmetrical about first and second longitudinal axes respectively, said first and second longitudinal axes being colinear and forming a common longitudinal axis, and said first and second portions being joined through a cylindrical web of predetermined minimum thickness;
   wherein said cylindrical web is radially spaced apart from and symmetrically disposed about said common longitudinal axis;
   wherein the valve body totally encloses a hollow; said hollow being symmetrical about said common longitudinal axis and extending radially from said common longitudinal axis to said cylindrical web;
   wherein said first portion comprises a top guide stem extending away from said hollow along said first longitudinal axis, and said second portion comprises a crow-foot guide extending away from said hollow along said second longitudinal axis; and
   wherein said cylindrical web spaces apart and connects opposing walls of an integral seal retention groove in the valve body.

2. The valve body of claim 1 wherein said opposing integral seal retention groove walls comprise at least one serration.

3. The valve body of claim 2 wherein said at least one serration comprises an as-machined surface.

4. The valve body of claim 2 wherein said at least one serration comprises an as-forged surface.

5. A full-open seat, stem-guided valve comprising the valve body of claim 1, a corresponding full-open seat, and an elastomeric seal cast and cured in said integral seal retention groove of the valve body without a bonding agent between said elastomeric seal and said seal retention groove.

6. A valve body for use in a full-open seat, stem-guided valve, the valve body comprising:
- first and second portions symmetrical about first and second longitudinal axes respectively, said first and second longitudinal axes being colinear and forming a common longitudinal axis, and said first and second portions being joined through a cylindrical web of predetermined minimum thickness;
- wherein said cylindrical web is radially spaced apart from and symmetrically disposed about said common longitudinal axis;
- wherein the valve body encloses a hollow, said hollow being substantially symmetrical about said common longitudinal axis and extending radially from said common longitudinal axis to said cylindrical web;
- wherein said first portion comprises a top guide stem extending away from said hollow along said first longitudinal axis, and said second portion comprises a crow-foot guide extending away from said hollow along said second longitudinal axis;
- wherein said top guide stem comprises a longitudinal fluid passage;
- wherein said hollow is in fluid communication with space outside the valve body through said longitudinal fluid passage; and
- wherein said cylindrical web spaces apart and connects opposing walls of an integral seal retention groove in the valve body.

7. The valve body of claim 6 wherein welding flash protrudes from said cylindrical web into said integral seal retention groove.

8. The valve body of claim 6 wherein said opposing integral seal retention groove walls comprise at least one serration.

9. A full-open seat, stem-guided valve comprising the valve body of claim 6, a corresponding full-open seat, and an elastomeric seal in said integral seal retention groove of the valve body, and wherein said longitudinal fluid passage is plugged.

10. A full-open seat, stem-guided valve comprising the valve body of claim 7, a corresponding full-open seat, and an elastomeric seal cast and cured in said integral seal retention groove of the valve body, said seal enveloping said welding flash without use of a bonding agent.

* * * * *